US012738253B2

(12) United States Patent
Namie et al.

(10) Patent No.: US 12,738,253 B2
(45) Date of Patent: Sep. 15, 2026

(54) DISPLAY APPARATUS, NON-TRANSITORY RECORDING MEDIUM, AND DISPLAY METHOD

(71) Applicants: Kenji Namie, Kanagawa (JP); Hideaki Iijima, Kanagawa (JP)

(72) Inventors: Kenji Namie, Kanagawa (JP); Hideaki Iijima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 258 days.

(21) Appl. No.: 18/505,650

(22) Filed: Nov. 9, 2023

(65) Prior Publication Data

US 2024/0169954 A1 May 23, 2024

(30) Foreign Application Priority Data

Nov. 22, 2022 (JP) ................................ 2022-186596

(51) Int. Cl.
*G09G 5/00* (2006.01)
*G06F 3/147* (2006.01)
*G09G 5/12* (2006.01)

(52) U.S. Cl.
CPC ............. *G09G 5/006* (2013.01); *G06F 3/147* (2013.01); *G09G 5/12* (2013.01); *G09G 2320/0613* (2013.01); *G09G 2320/0693* (2013.01); *G09G 2320/08* (2013.01); *G09G 2330/022* (2013.01); *G09G 2354/00* (2013.01); *G09G 2370/16* (2013.01); *G09G 2370/22* (2013.01)

(58) Field of Classification Search
None
See application file for complete search history.

(56) References Cited

U.S. PATENT DOCUMENTS 8,035,685 B2 * 10/2011 Jensen .................. G16H 40/67 348/75
9,892,691 B1 * 2/2018 Lim ......................... G09G 5/10
2009/0125969 A1 * 5/2009 Hill .................... H04N 21/4622 725/143
2018/0061361 A1 * 3/2018 Peshkar .................. H04L 67/12
2020/0167013 A1 5/2020 Saito
2021/0303058 A1 * 9/2021 Hsieh ................. H04N 21/4122
2021/0314222 A1 * 10/2021 D'Amato ................ H04L 43/08
2023/0067554 A1 3/2023 Asanuma
2023/0280794 A1 9/2023 Iijima

FOREIGN PATENT DOCUMENTS

JP 2007-206839 A 8/2007
JP 2016-122286 A 7/2016
JP 2017-103543 A 6/2017
JP 2018-137555 A 8/2018

* cited by examiner

*Primary Examiner* — Yi Wang
(74) *Attorney, Agent, or Firm* — IPUSA, PLLC

(57) ABSTRACT

A display apparatus includes circuitry to receive video input via a wired connection or a wireless connection from a communication terminal, output the video via the wired connection or the wireless connection based on an input setting indicating which one of the wired connection and the wireless connection is set, and in a case where the input setting is set to the wireless connection, change a transition condition of the display apparatus, the transition condition indicating a condition in which the display apparatus shifts from an output-enabled mode in which the video is displayed, to a power-saving mode in which the video is not displayed.

15 Claims, 22 Drawing Sheets

DISPLAY APPARATUS
20
SPEAKER
109
DISPLAY PANEL
102
102a
TOUCH SENSOR
HDMI I/F
111
111A
110
COMMUNI-CATION TERMINAL
40
HARD KEY
104
CONTROLLER
101
POWER SUPPLY
107
BATTERY
108
COMMUNI-CATION I/F
103
USB I/F
105
105A
COMMUNICA-TION TERMINAL
40
COMMUNICA-TION TERMINAL
40
110

40
410
421
TOUCH PANEL
411
GPS RECEIVER
420a
420
SHORT-DISTANCE COMMUNICATION CIRCUIT
409
MEDIUM I/F
408
RECORDING MEDIUM
419
EXTERNAL DEVICE I/F
407
ACCELERATION AND ORIENTATION SENSOR
418
DISPLAY
406
IMAGING ELEMENT I/F
405
CMOS SENSOR
416
SPEAKER
415
MICRO-PHONE
417
AUDIO INPUT AND OUTPUT I/F
404
EEPROM
403
RAM
413
CMOS SENSOR
414
IMAGING ELEMENT I/F
402
ROM
412a
412
LONG-DISTANCE COMMUNICATION CIRCUIT
401
CPU

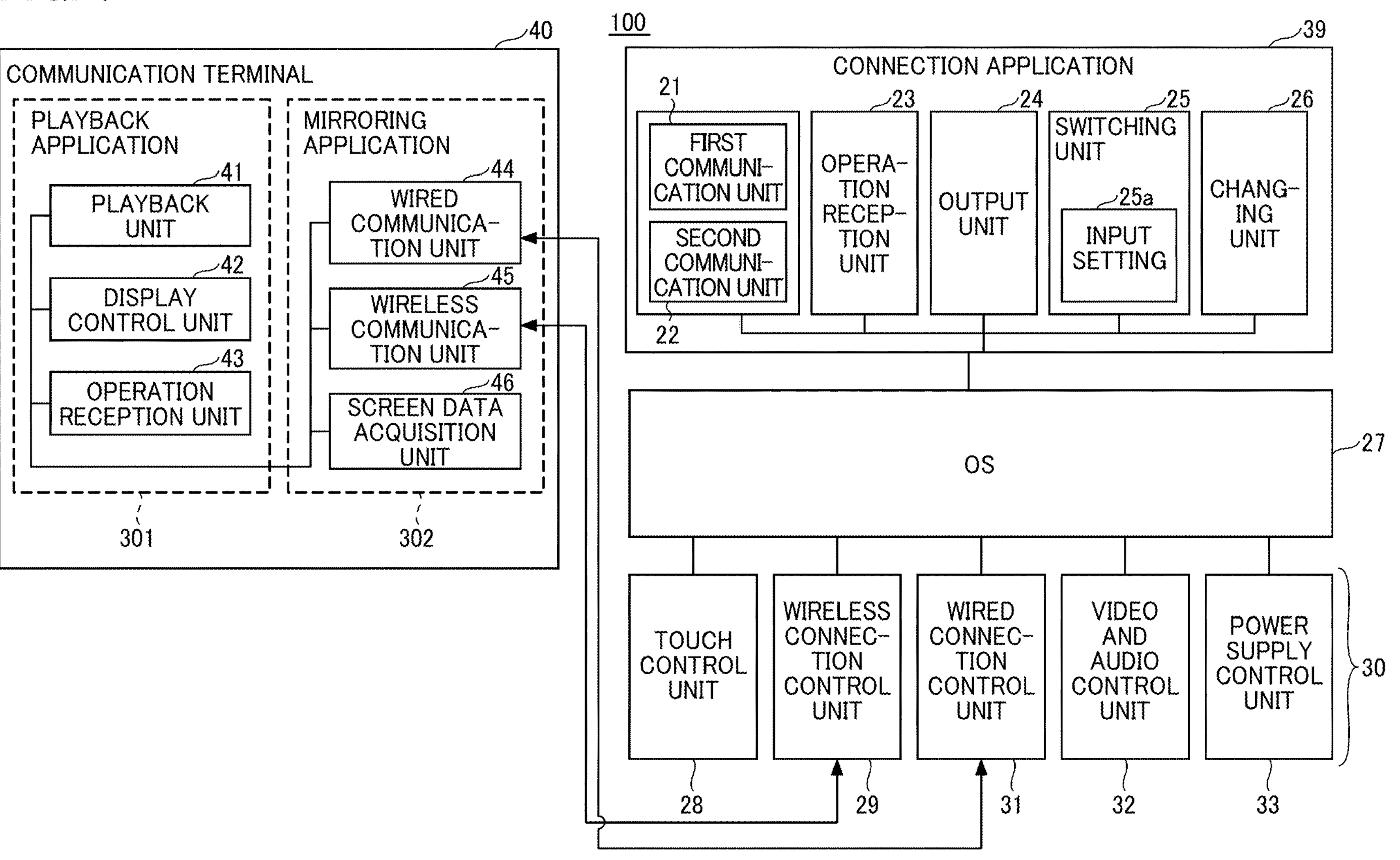
FIG. 5
COMMUNICATION TERMINAL
40
PLAYBACK APPLICATION
PLAYBACK UNIT
41
DISPLAY CONTROL UNIT
42
OPERATION RECEPTION UNIT
43
301
MIRRORING APPLICATION
WIRED COMMUNICA-TION UNIT
44
WIRELESS COMMUNICA-TION UNIT
45
SCREEN DATA ACQUISITION UNIT
46
302
100
CONNECTION APPLICATION
39
FIRST COMMUNI-CATION UNIT
21
SECOND COMMUNI-CATION UNIT
22
OPERA-TION RECEP-TION UNIT
23
OUTPUT UNIT
24
SWITCHING UNIT
25
INPUT SETTING
25a
CHANG-ING UNIT
26
OS
27
TOUCH CONTROL UNIT
28
WIRELESS CONNEC-TION CONTROL UNIT
29
WIRED CONNEC-TION CONTROL UNIT
31
VIDEO AND AUDIO CONTROL UNIT
32
POWER SUPPLY CONTROL UNIT
33
30

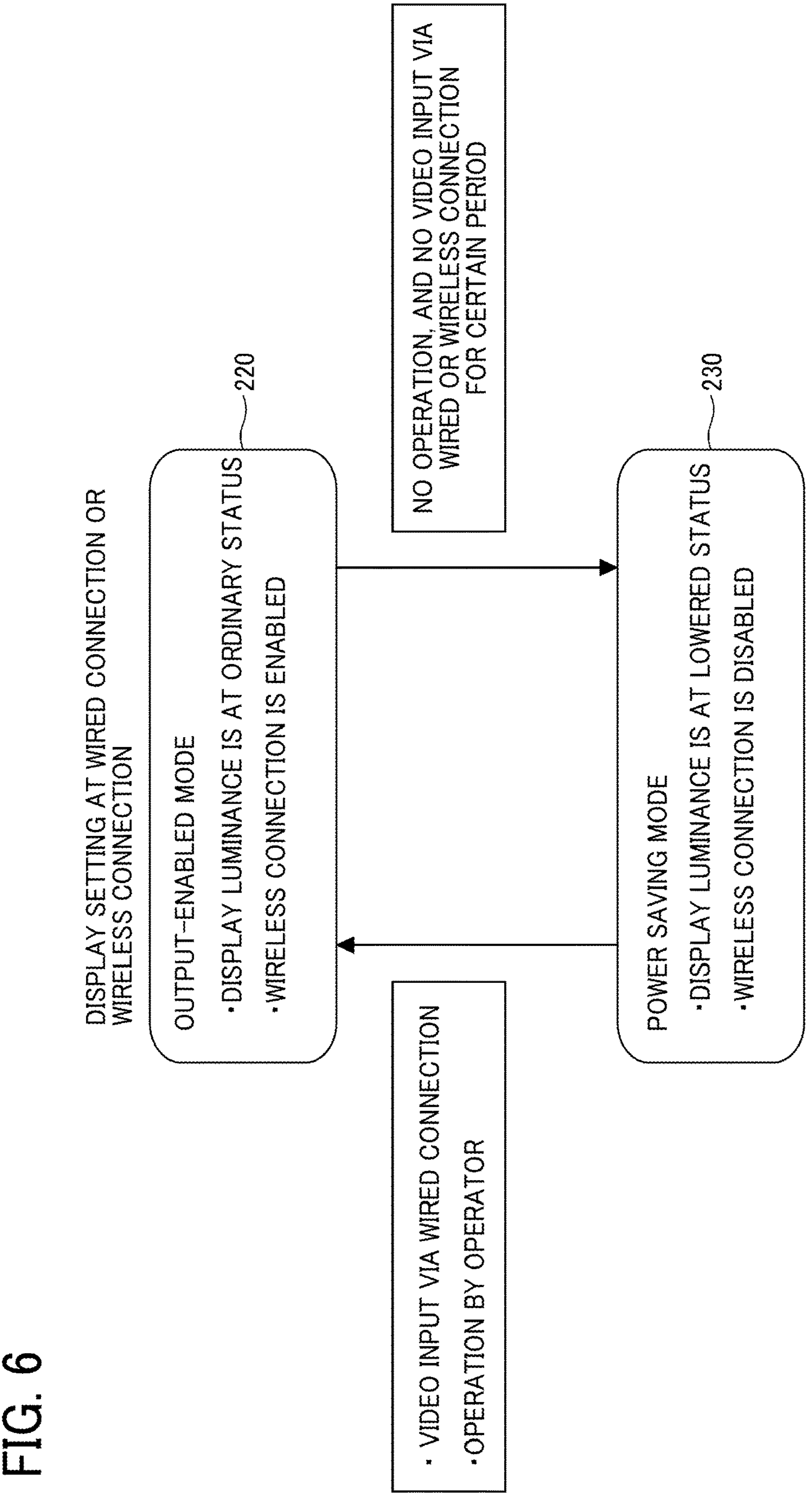
FIG. 6
DISPLAY SETTING AT WIRED CONNECTION OR WIRELESS CONNECTION
220
OUTPUT-ENABLED MODE
·DISPLAY LUMINANCE IS AT ORDINARY STATUS
·WIRELESS CONNECTION IS ENABLED
NO OPERATION, AND NO VIDEO INPUT VIA WIRED OR WIRELESS CONNECTION FOR CERTAIN PERIOD
230
POWER SAVING MODE
·DISPLAY LUMINANCE IS AT LOWERED STATUS
·WIRELESS CONNECTION IS DISABLED
· VIDEO INPUT VIA WIRED CONNECTION
·OPERATION BY OPERATOR

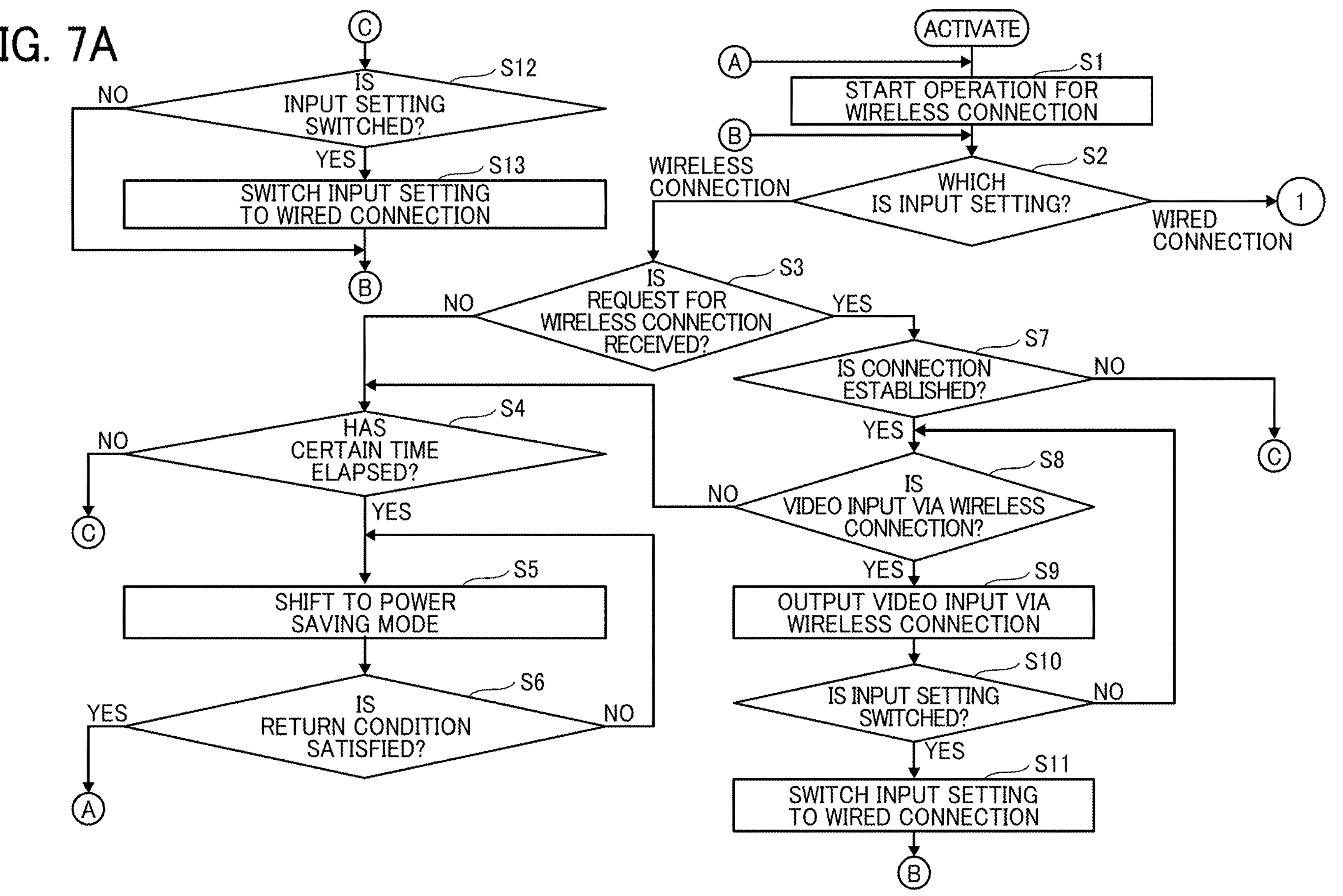

FIG. 7A
ACTIVATE
A
S1
START OPERATION FOR WIRELESS CONNECTION
B
S2
WHICH IS INPUT SETTING?
WIRELESS CONNECTION
WIRED CONNECTION
1
S3
IS REQUEST FOR WIRELESS CONNECTION RECEIVED?
YES
NO
S7
IS CONNECTION ESTABLISHED?
YES
NO
C
S8
IS VIDEO INPUT VIA WIRELESS CONNECTION?
YES
NO
S9
OUTPUT VIDEO INPUT VIA WIRELESS CONNECTION
S10
IS INPUT SETTING SWITCHED?
YES
NO
S11
SWITCH INPUT SETTING TO WIRED CONNECTION
B
C
S12
IS INPUT SETTING SWITCHED?
YES
NO
S13
SWITCH INPUT SETTING TO WIRED CONNECTION
B
S4
HAS CERTAIN TIME ELAPSED?
YES
NO
C
S5
SHIFT TO POWER SAVING MODE
S6
IS RETURN CONDITION SATISFIED?
YES
NO
A

Figure 7B:
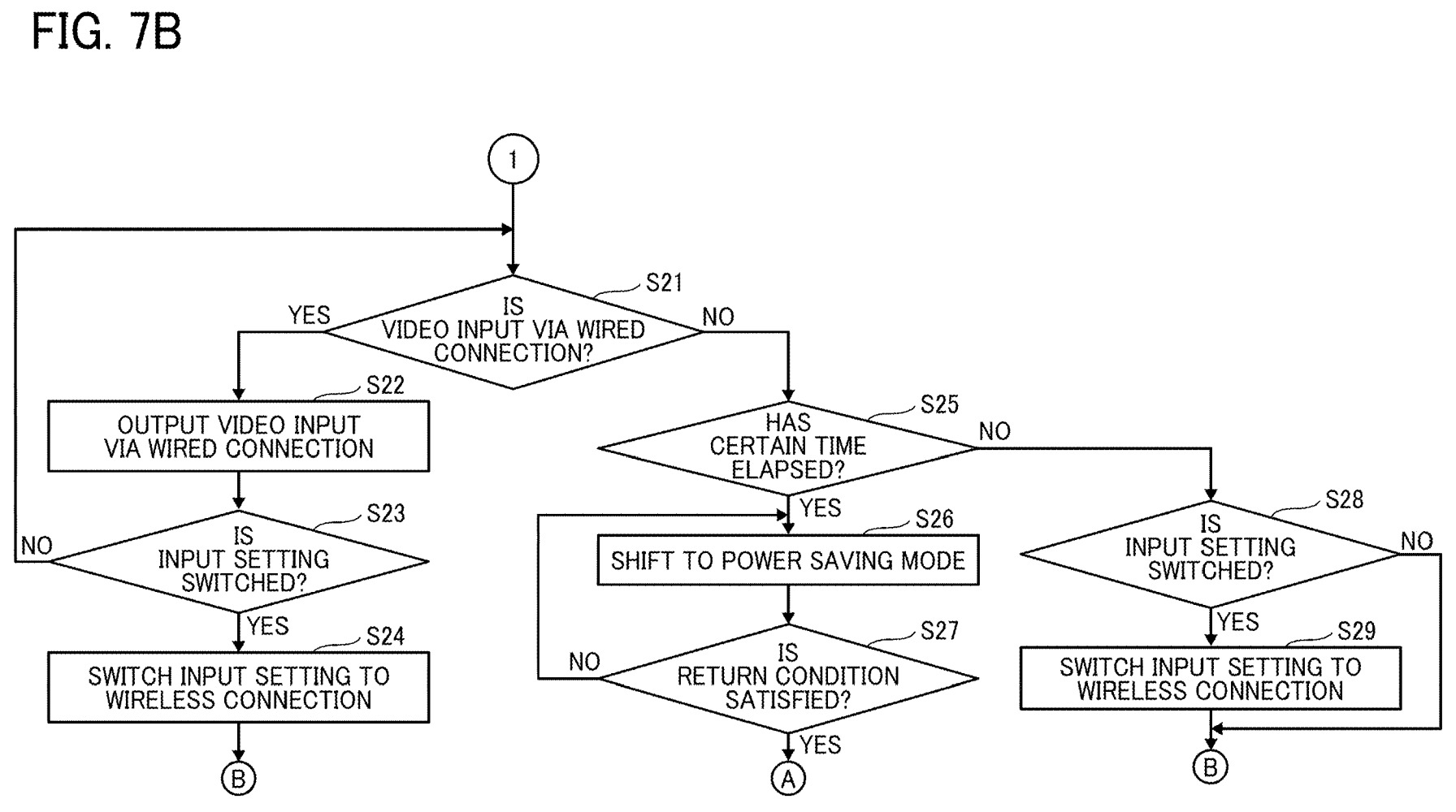

S21
IS
VIDEO INPUT VIA WIRED
CONNECTION?
YES
NO

S22
OUTPUT VIDEO INPUT
VIA WIRED CONNECTION

S23
IS
INPUT SETTING
SWITCHED?
YES
NO

S24
SWITCH INPUT SETTING TO
WIRELESS CONNECTION

B

S25
HAS
CERTAIN TIME
ELAPSED?
YES
NO

S26
SHIFT TO POWER SAVING MODE

S27
IS
RETURN CONDITION
SATISFIED?
YES
NO

A

S28
IS
INPUT SETTING
SWITCHED?
YES
NO

S29
SWITCH INPUT SETTING TO
WIRELESS CONNECTION

B

FIG. 8
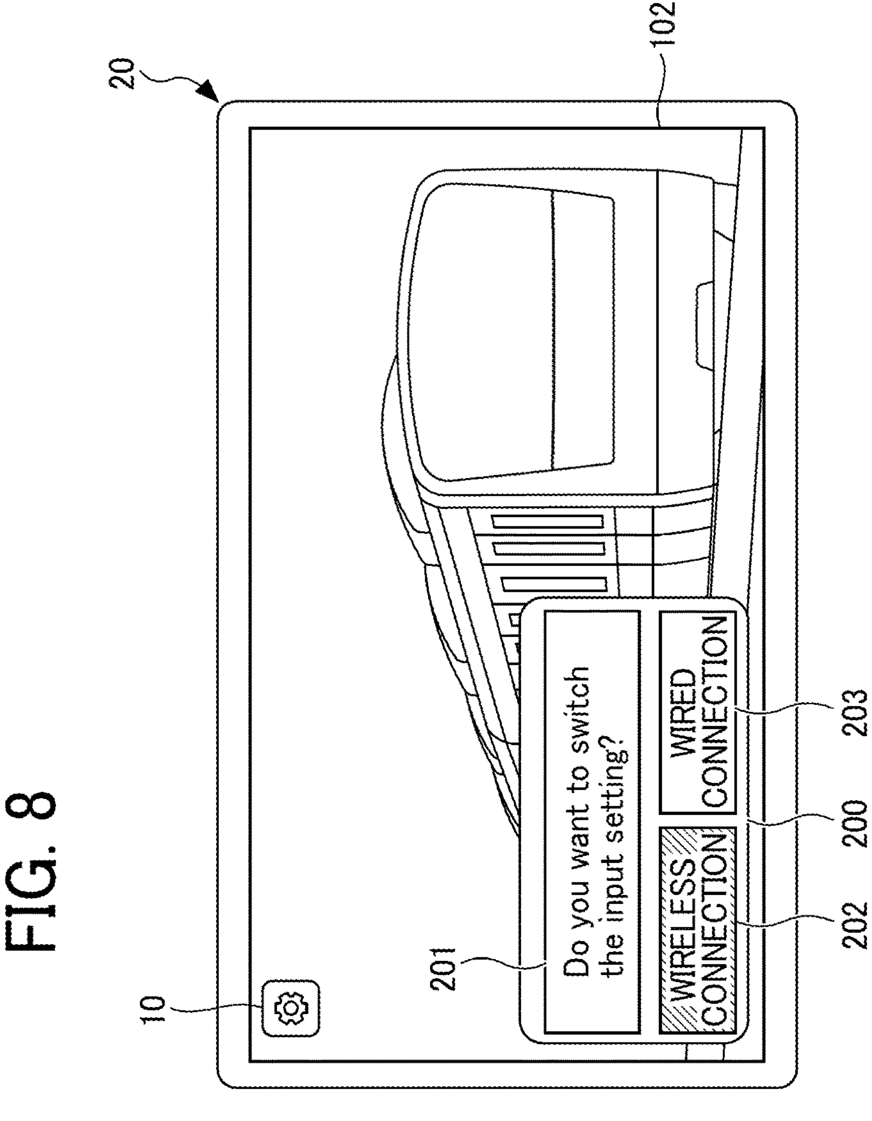
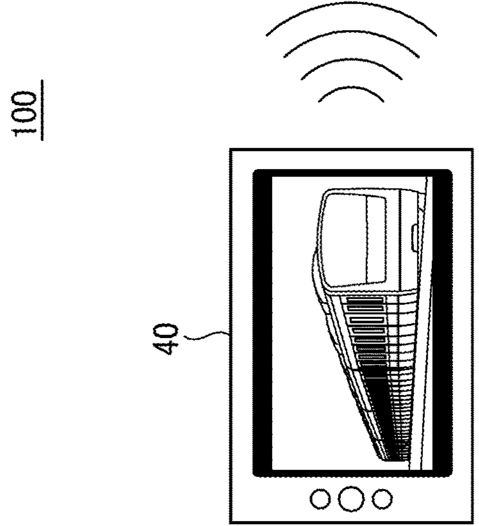

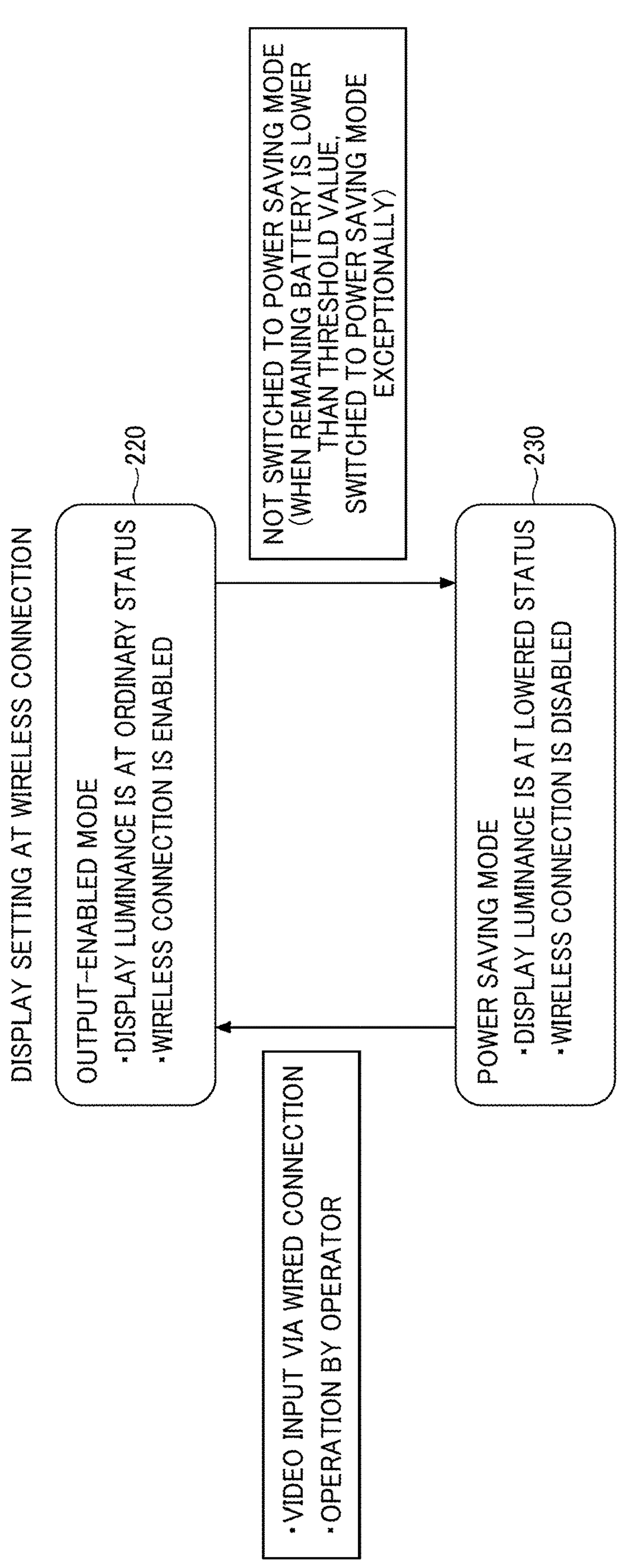
FIG. 9
DISPLAY SETTING AT WIRELESS CONNECTION
OUTPUT-ENABLED MODE
·DISPLAY LUMINANCE IS AT ORDINARY STATUS
·WIRELESS CONNECTION IS ENABLED
220
NOT SWITCHED TO POWER SAVING MODE
(WHEN REMAINING BATTERY IS LOWER THAN THRESHOLD VALUE, SWITCHED TO POWER SAVING MODE EXCEPTIONALLY)
POWER SAVING MODE
·DISPLAY LUMINANCE IS AT LOWERED STATUS
·WIRELESS CONNECTION IS DISABLED
230
·VIDEO INPUT VIA WIRED CONNECTION
·OPERATION BY OPERATOR

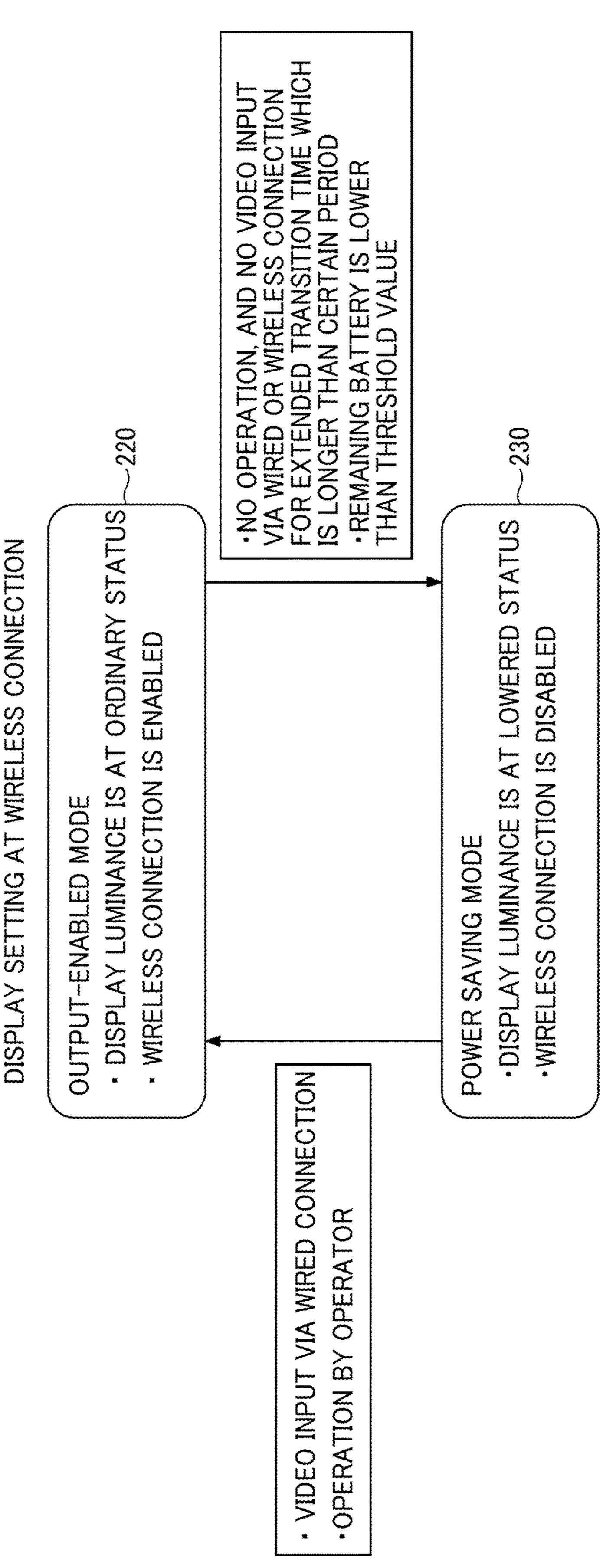
FIG. 11
DISPLAY SETTING AT WIRELESS CONNECTION
OUTPUT-ENABLED MODE
· DISPLAY LUMINANCE IS AT ORDINARY STATUS
· WIRELESS CONNECTION IS ENABLED
220
·NO OPERATION, AND NO VIDEO INPUT VIA WIRED OR WIRELESS CONNECTION FOR EXTENDED TRANSITION TIME WHICH IS LONGER THAN CERTAIN PERIOD
·REMAINING BATTERY IS LOWER THAN THRESHOLD VALUE
POWER SAVING MODE
·DISPLAY LUMINANCE IS AT LOWERED STATUS
·WIRELESS CONNECTION IS DISABLED
230
· VIDEO INPUT VIA WIRED CONNECTION
·OPERATION BY OPERATOR

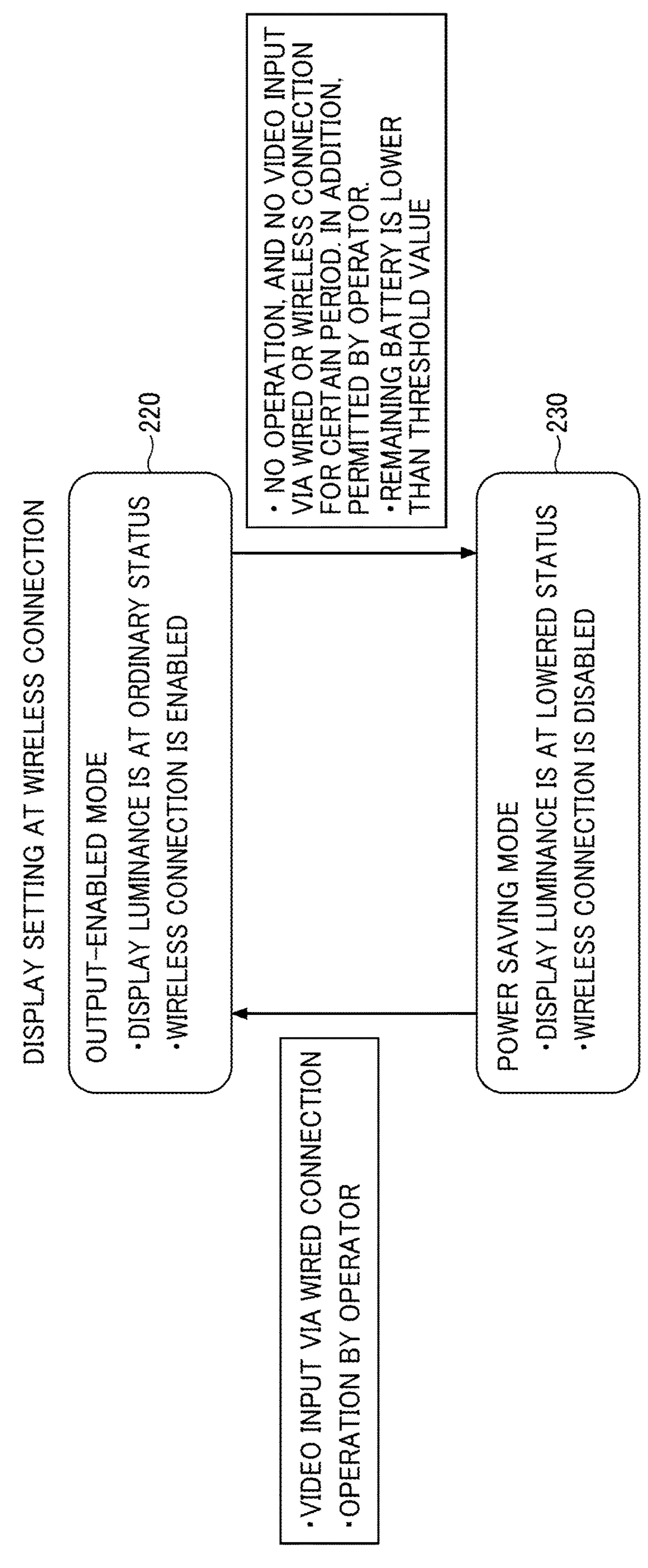
FIG. 13
DISPLAY SETTING AT WIRELESS CONNECTION
OUTPUT-ENABLED MODE
·DISPLAY LUMINANCE IS AT ORDINARY STATUS
·WIRELESS CONNECTION IS ENABLED
220
· NO OPERATION, AND NO VIDEO INPUT VIA WIRED OR WIRELESS CONNECTION FOR CERTAIN PERIOD. IN ADDITION, PERMITTED BY OPERATOR.
·REMAINING BATTERY IS LOWER THAN THRESHOLD VALUE
POWER SAVING MODE
·DISPLAY LUMINANCE IS AT LOWERED STATUS
·WIRELESS CONNECTION IS DISABLED
230
·VIDEO INPUT VIA WIRED CONNECTION
·OPERATION BY OPERATOR

20

102

210

211

Do you want to switch the mode
to the power saving mode?

212

YES

213

NO

100

DISPLAY APPARATUS, NON-TRANSITORY RECORDING MEDIUM, AND DISPLAY METHOD

CROSS-REFERENCE TO RELATED APPLICATIONS

This patent application is based on and claims priority pursuant to 35 U.S.C. § 119(a) to Japanese Patent Application No. 2022-186596, filed on Nov. 22, 2022, in the Japan Patent Office, the entire disclosure of which is hereby incorporated by reference herein.

BACKGROUND

Technical Field

Embodiments of the present disclosure relate to a display apparatus, a non-transitory recording medium, and a display method.

Related Art

Some technologies have been proposed that a communication terminal such as a smartphone or a personal computer (PC) and a display apparatus such as a display or a projector wirelessly communicate with each other, and video and audio are wirelessly output from the communication terminal to the display apparatus. Other technologies have also been proposed that the communication terminal is operated from the display apparatus by the display apparatus wirelessly transmitting not only the video and the audio but also a touch signal generated by an operator touching the display apparatus to the communication terminal.

According to the technologies described above, when no video is input from the communication terminal, the display apparatus shifts to a sleep status. When a video is input from the communication terminal, the display apparatus returns from the sleep status. As a result, the consumption of the electric power is reduced. For example, an operation unit and a method for returning from the sleep status in response to a connection request to connect to the display apparatus via a short-range wireless communication from a client terminal are disclosed.

SUMMARY

In one aspect, a display apparatus includes circuitry to receive video input via a wired connection or a wireless connection from a communication terminal, output the video via the wired connection or the wireless connection based on an input setting indicating which one of the wired connection and the wireless connection is set, and in a case where the input setting is set to the wireless connection, change a transition condition of the display apparatus, the transition condition indicating a condition in which the display apparatus shifts from an output-enabled mode in which the video is displayed, to a power-saving mode in which the video is not displayed.

In another aspect, a non-transitory recording medium storing a plurality of program codes which, when executed by one or more processors, causes the one or more processors to perform a method. The method includes receiving video input via a wired connection or a wireless connection from a communication terminal, outputting the video via the wired connection or the wireless connection based on an input setting indicating which one of the wired connection and the wireless connection is set, and in a case where the input setting is set to the wireless connection, changing a transition condition of a display apparatus, the transition condition indicating a condition in which the display apparatus shifts from an output-enabled mode in which the video is displayed, to a power-saving mode in which the video is not displayed.

In another aspect, a display method executed by a display apparatus includes receiving video input via a wired connection or a wireless connection from a communication terminal, outputting the video via the wired connection or the wireless connection based on an input setting indicating which one of the wired connection and the wireless connection is set, and in a case where the input setting is set to the wireless connection, changing a transition condition of the display apparatus, the transition condition indicating a condition in which the display apparatus shifts from an output-enabled mode in which the video is displayed, to a power-saving mode in which the video is not displayed.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 5 is a block diagram illustrating functional configurations of a communication terminal and a display apparatus, according to an embodiment of the present disclosure;

FIG. 6 is a diagram illustrating statuses of a power supply of a display apparatus, a transition condition to shift to a power-saving mode, and a return condition to return from the power-saving mode, according to an embodiment of the present disclosure;

FIGS. 7A and 7B are flowcharts of the processing performed by a display apparatus to shift to a power-saving mode from an output-enabled mode and to return to the output-enabled mode from the power-saving mode;

FIG. 8 is a diagram illustrating a dialog box for switching an input setting displayed by a display apparatus according to an embodiment of the present disclosure;

FIG. 9 is a diagram illustrating statuses of a power supply of a display apparatus, another transition condition to shift to a power-saving mode, and another return condition to return to the power-saving mode when an input setting is set to a wireless connection, according to an embodiment of the present disclosure;

FIG. 11 is a diagram illustrating statuses of a power supply of a display apparatus, still another transition condition to shift to a power-saving mode, and still another return condition to return to the power-saving mode when an input setting is set to a wireless connection, according to an embodiment of the present disclosure;

FIG. 13 is a diagram illustrating statuses of a power supply of a display apparatus, still another transition condition to shift to a power-saving mode, and still another return condition to return to the power-saving mode when an input setting is set to a wireless connection, according to an embodiment of the present disclosure;

Figure 1A:
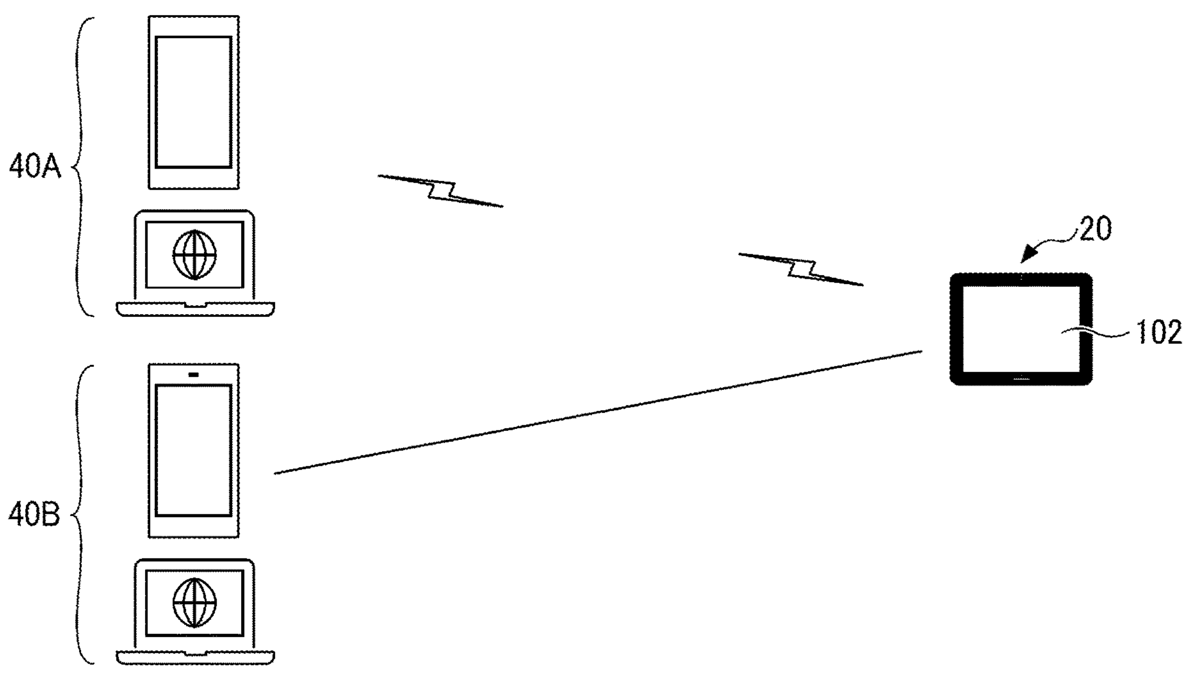
FIGS. 1A and 1B are schematic diagrams each illustrating an operation of a display system in which a display apparatus outputs video and audio output by communication terminals, according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A display system and a display method performed by the display system according to embodiments of the present disclosure are described below with reference to the drawings.

Figure 1B:
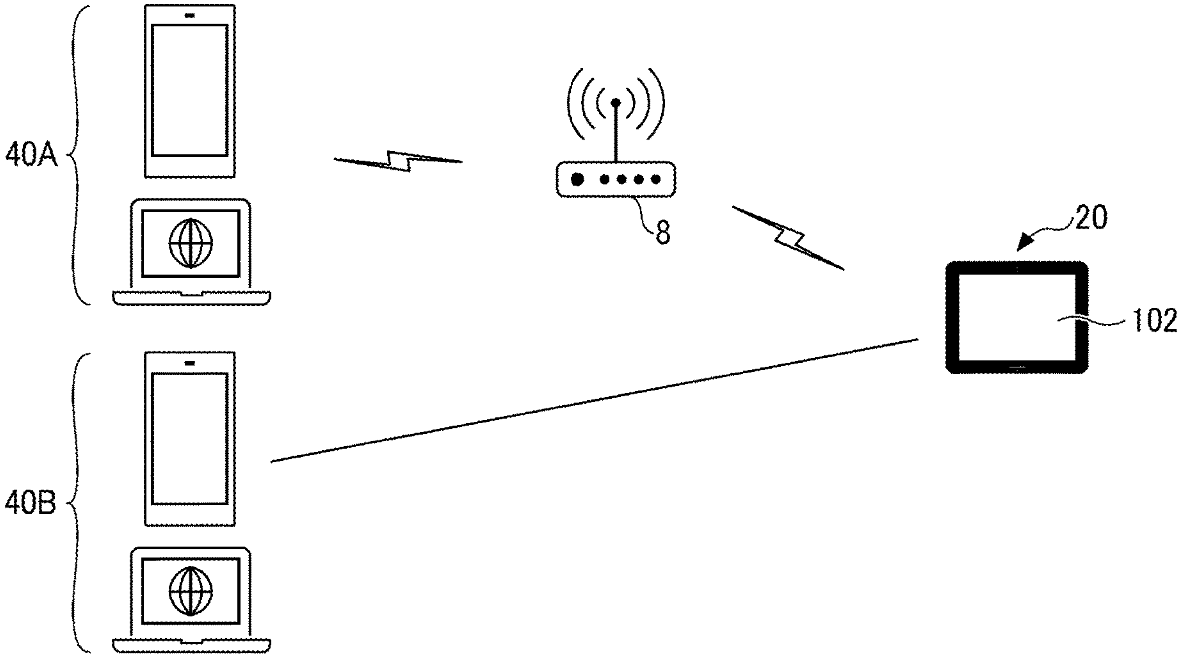

FIGS. 1A and 1B are schematic diagrams each illustrating an operation of a display system 100 in which a display apparatus 20 outputs video and audio output by communication terminals 40, according to an embodiment of the present disclosure.

The display apparatus 20 has a wireless connection function such as BLUETOOTH or WIRELESS FIDELITY (Wi-Fi). Unless the display apparatus 20 is in a power-saving mode, the wireless connection function maintains a standby status while continuously operating to sense a device to be connected. When no video is determined to be input via a wired connection or a wireless connection for a certain period of time, the display apparatus 20 shifts to the power-saving mode.

In FIG. 1A, two communication terminals 40 (such as communication terminals 40A and 40B) and one display apparatus 20 are provided. In FIG. 1A, the communication terminal 40A and the display apparatus 20 are connected via the wireless connection (without an access point), and the communication terminal 40B and the display apparatus 20 are connected via the wired connection.

In FIG. 1B, the communication terminal 40A and the display apparatus 20 are connected via the wireless connection (with an access point 8), and the communication terminal 40B and the display apparatus 20 are connected via the wired connection. In the present embodiment, the access point 8 may or may not be provided.

The display apparatus 20 is set to display the video to be input from the communication terminal 40 when the display apparatus 20 is turned on and activated. In this case, the display apparatus 20 displays the video input via the wired connection or the wireless connection in accordance with the input setting of the wired connection or the wireless connection set on the display apparatus 20 at the time the display apparatus 20 is turned off.

It is assumed that the input setting of the display apparatus 20 is set to the wired connection. In this case, when the display apparatus 20 receives the video input from the communication terminal 40B via a video cable, the video input from the communication terminal 40B is displayed on a display panel 102 of the display apparatus 20. It is assumed that the input setting of the display apparatus 20 is set to the wireless connection. In this case, when the display apparatus 20 receives the video input from the communication terminal 40A by wireless communication, the video input from the communication terminal 40A is displayed on the display panel 102 of the display apparatus 20.

According to a technique (comparative technique) in the related art compared with the present embodiment, regardless of whether the input setting is set to the wired connection or the wireless connection, the display apparatus 20 shifts to the power-saving mode when a certain period of time elapses since the input of the video is stopped.

If both of the communication terminals 40A and 40B are connected to the display apparatus 20 via the wired connection, the display apparatus 20 displays the video input from both of the communication terminals 40A and 40B (by dividing the screen), or the video input from one of the communication terminal 40A and 40B (according to the selection of the operator or the selection automatically).

When the input setting for the video to be displayed on the display panel 102 is set to the wireless connection, the display apparatus 20 according to the present embodiment does not shift to the power-saving mode even after a certain period of time elapses since the input of the video is stopped, or extends the certain period of time to be longer than that in the case of the wired connection. However, when the remaining battery level is low, the display apparatus 20 shifts to the power-saving mode under normal operating conditions.

By performing the power control described above, the display apparatus 20 can achieve both power saving and smooth wireless connection. For example, even when the operator takes time to set up the wireless connection of the communication terminal 40, the display apparatus 20 does not automatically shift to the power-saving mode. Accordingly, the display apparatus 20 is restricted from shifting to the power-saving mode and being unable to be connected via the wireless connection while the operator takes time to set up the wireless connection of the communication terminal 40.

The input setting is a setting for determining whether the display apparatus 20 outputs video and audio received by wireless communication or video and audio received by wired communication. The input setting is set by the operator as desired. In addition, there may be a case where the input setting automatically switches. When the input setting is set to the wired connection, the display apparatus 20 discards or does not receive the video and the audio received via the wireless connection. On the other hand, when the input setting is set to the wireless connection, the display apparatus 20 discards or does not receive the video and the audio received via the wired connection.

The wired connection refers to a setting for outputting either of or both the video and audio that are received via a wired cable. In the case where the wired connection is set, it is not necessary that the communication is actually performed via the wired cable. The wireless connection refers to a setting for outputting either of or both the video and audio that are received wirelessly. In the case where the wireless connection is set, it is not necessary that the communication is actually performed wirelessly. However, in the case where the wired connection is set, the video and the audio may be actually received via the wired cable. Also, in the case where the wireless connection is set, the video and the audio may be actually received wirelessly.

A transition condition is a condition for shifting to the power-saving mode from the output-enabled mode. A return condition is a condition for returning to the output-enabled mode from the power-saving mode. Changing the transition condition means, as one example, restricting the transition from the output-enabled mode to the power-saving mode even slightly in the present embodiment.

For example, a situation in which a teacher uses the communication terminal 40 and students use the display apparatuses 20 at school is a scene in which the display system 100 is used. The teacher can proceed with the lecture while sharing the screen data of the communication terminal 40 with the students. The students can input the answers to an assignment or questions regarding the assignment onto the respective display apparatuses 20 for sharing with the teacher. Handwritten data input by one student onto one display apparatus 20 can be shared between the communication terminal 40 and the other display apparatuses 20 of the other students.

In addition, various other situations in which a presenter uses the communication terminal 40 to share the screen data with participants, for example, a conference, a product briefing session, and a presentation, are scenes in which the display system 100 is used.

The display apparatus 20 is a thin display apparatus that incorporates a battery and is portable. Accordingly, the display apparatus 20 is carried together with the communication terminal 40, and can be used as an extended display of the communication terminal 40 when connected to the communication terminal 40 at the time of use.

For example, the display apparatus 20 may be used as an extended display by a sales representative when the sales representative makes a presentation at a customer site. Further, for example, the display apparatus 20 may be used as an external display for the communication terminal 40 such as a personal computer (PC) at an office. Furthermore, for example, the display apparatus 20 may be used as an extended display for watching a moving image or working at home when the display apparatus 20 is connected to a smartphone used by an individual outside of an office.

Figure 2:
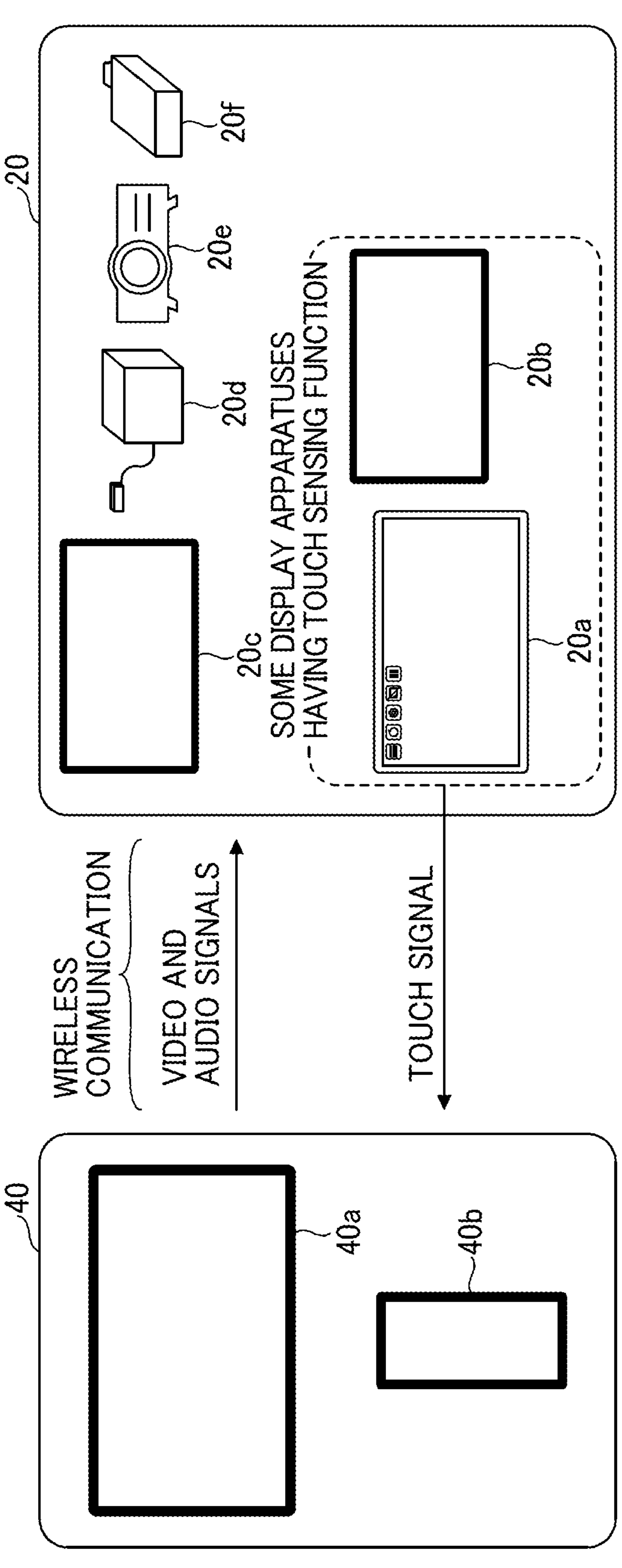
FIG. 2 is a diagram illustrating a configuration of a display system according to an embodiment of the present disclosure.

FIG. 2 is a diagram illustrating a configuration of the display system 100 according to an embodiment of the present disclosure.

The communication terminal 40 and the display apparatus 20 can communicate wirelessly. The wireless communication method is communication using, for example, Wi-Fi Direct or BLUETOOTH, but the communication method is not limited to any particular method. The communication method may be communication via the access point 8 (Wi-Fi router) instead of one-to-one communication (peer-to-peer (P2P)). Alternatively, the communication terminal 40 and the display apparatus 20 may communicate with each other via the same server apparatus. In this case, the communication terminal 40 and the display apparatus 20 are associated with each other by the server apparatus. The server apparatus transmits video and audio input from the communication terminal 40 to the display apparatus 20 and transmits a touch signal input from the display apparatus 20 to the communication terminal 40.

As communication standards that enable wireless communication between the communication terminal 40 and the display apparatus 20, for example, MIRACAST, GOOGLE CAST, and AIRPLAY are known. The communication terminal 40 and the display apparatus 20 communicate with each other using these communication standards or communication methods enhanced from the communication standards. For example, MIRACAST is a display transmission technology designed by the Wi-Fi Alliance using a one-to-one wireless communication method. Miracast uses streaming technology to transmit images, audio, and video from a host device to another wirelessly paired device. MIRACAST is a technology that wirelessly performs display that is performed using a dedicated cable. For example, since the functions implemented by HIGH-DEFINITION MULTIMEDIA INTERFACE (HDMI) can be implemented wirelessly, MIRACAST is sometimes called wireless HDMI.

The communication terminal 40 and the display apparatus 20 may be connected via a wired video output interface such as HDMI, DISPLAYPORT, or THUNDERBOLT. Regardless of the form of the connection, the communication terminal 40 can transmit at least one of video and audio to the display apparatus 20, and the display apparatus 20 can transmit, for example, a touch signal to the communication terminal 40. Accordingly, the communication between the communication terminal 40 and the display apparatus 20 is bidirectional. However, the transmission from the display apparatus 20 to the communication terminal 40 may have a narrow band or may not be needed.

The communication terminal 40 may be, for example, a PC 40*a* (such as a desktop PC or a notebook PC), a smartphone 40*b*, or a tablet terminal used by the operator.

The communication terminal 40 may be any communication terminal that can execute at least an application compatible with wireless communication and an application for playing back video. The communication terminal 40 is typically portable to be carried by the operator, but may be of a stationary type. The communication terminal 40 may have a general-purpose configuration, and does not require any special hardware or installation of an application dedicated to the present embodiment. However, when a dedicated application is installed in the display apparatus 20 of the present embodiment, the convenience for the operator is further enhanced.

A device that transmits contents (sources) to be output, such as the communication terminal 40, is referred to as a source device. The source device does not refer to a specific device but to a transmission source of contents. Similarly, a device that receives contents to be output, such as the display apparatus 20, is referred to as a sink device. The sink device does not refer to a specific device but to a transmission destination of contents. Accordingly, the communication terminal 40 may serve as a sink device, and the display apparatus 20 may serve as a source device.

The display apparatus 20 is, for example, a display 20*a* such as a liquid crystal display or an organic electro-luminescence (EL) display, a PC 20*b* (of a display integrated type), a television receiver 20*c*, a set-top box 20*d*, a projector 20*c*, or a wireless communication device 20*f*. The display apparatus 20 is any display apparatus that has at least a wireless communication function, and may further have a display function. Each of the display 20*a*, the PC 20*b*, the television receiver 20*c*, and the projector 20*e* has a display function, whereas neither the set-top box 20*d* nor the wireless communication device 20*f* has a display function.

The display apparatus 20 (except for the wireless communication device 20*f*) has a wireless communication function that may be built in or externally attached. Since the wireless communication device 20*f* is a device having a wireless communication function in itself, the wireless communication device 20*f* may be externally attached to the display apparatus 20 except for the wireless communication device 20*f*. For example, when the wireless communication device 20*f* is connected to the universal serial bus (USB) interfaces (I/Fs) of the display 20*a*, the PC 20*b*, the television receiver 20*c*, the set-top box 20*d*, and the projector 20*c*, which do not have the built-in wireless communication function, these devices can wirelessly communicate with the communication terminal 40. A situation in which the wireless communication device 20*f* is connected to the display 20*a*, the PC 20*b*, the television receiver 20*c*, the set-top box 20*d*, or the projector 20*e* may be referred to as a wireless video display system.

As the set-top box 20*d*, for example, a cable television receiver and a satellite broadcast receiver are known. As the wireless communication device 20*f*, for example, devices conforming to the above-described MIRACAST, GOOGLE CAST, or AIRPLAY, and a stick-type PC are known.

In the display apparatus 20, an application compliant with the wireless communication is installed in advance or can be installed later, or the wireless communication function is built in or can be retrofitted. A part or an entirety of the wireless communication function may be implemented by hardware circuits.

The display apparatus 20 preferably includes a touch panel. The display apparatus 20 wirelessly transmits a touch signal generated by the operator touching the display apparatus 20 to the communication terminal 40. Accordingly, the operator can operate the communication terminal 40 by operating the display apparatus 20.

The hardware configurations of the display apparatus 20 and the communication terminal 40 are described below with reference to FIGS. 3 and 4.

Figure 3:
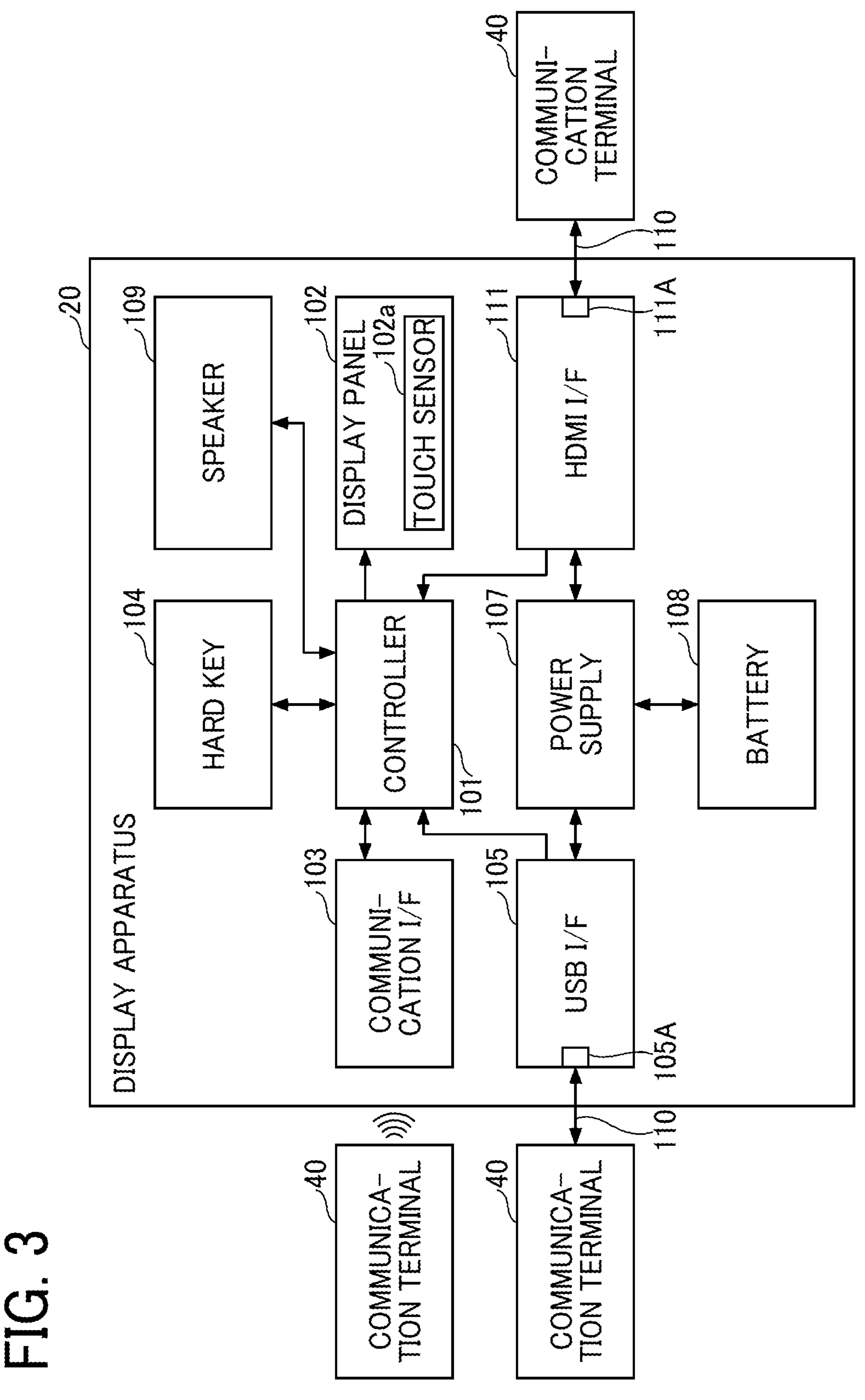
FIG. 3 is a block diagram illustrating a hardware configuration of a display apparatus according to an embodiment of the present disclosure.

FIG. 3 is a block diagram illustrating a hardware configuration of the display apparatus 20 according to an embodiment of the present disclosure.

The display apparatus 20 illustrated in FIG. 3 includes the display panel 102 on the front face of the housing. The display apparatus 20 receives a video signal from the communication terminal 40 by wireless communication or via a video cable 110 to display a video on the display panel 102 according to the video signal.

As illustrated in FIG. 3, the display apparatus 20 includes a controller 101, the display panel 102, a communication interface (I/F) 103, a hard key 104, a speaker 109, a universal serial bus (USB) interface (I/F) 105, a HIGH-DEFINITION MULTIMEDIA INTERFACE (HDMI) 111, a power supply 107, and a battery 108.

The controller 101 controls the entire operation of the display apparatus 20. For example, the controller 101 is implemented by a control circuit such as an integrated circuit (IC) including a central processing unit (CPU), a read-only memory (ROM), and a random access memory (RAM).

On the display panel 102, various images (such as moving images and still images) are displayed according to the video signals transmitted by the controller 101. A liquid crystal display or an organic EL display may be used as the display panel 102, for example. On the front face of the display panel 102, a touch sensor 102*a* is provided so as to overlap the display panel 102. The speaker 109 outputs various kinds of audio according to audio signal supplied from the controller 101.

The communication I/F 103 is an interface that controls the wireless connection (including the wireless communication) with the communication terminal 40. The communication I/F 103 wirelessly communicates with the communication terminal 40 (e.g., a laptop personal computer or a smartphone), and transmits and receives, for example, control signals and video signals to and from the communication terminal 40 through radio or wireless communication. For example, Wi-Fi is used as a wireless communication standard used by the communication I/F 103.

The hard key 104 is an interface that receives input from the operator with an operation performed by the operator. For example, the display apparatus 20 includes a plurality of buttons on side faces and the front face of the housing as hard keys 104. These buttons are, for example, a power button, a select button, an enter button, and a return button. The hard keys 104 are not limited to the above-described buttons. The display apparatus 20 may include, as the hard key 104, for example, a screen mute key which is a hard key that implements a screen mute icon that invalidates an operation to the screen. For example, in response to operations performed by the operator to the hard keys 104, the display apparatus 20 turns on and off the power and performs various settings such as settings of brightness and contrast.

The USB I/F 105 is an interface for connecting the communication terminal 40. The USB I/F 105 includes a USB port 105A compliant with the USB standard, and a USB cable such as the video cable 110 is connected to the USB port 105A. Accordingly, the USB I/F 105 is connected to the communication terminal 40 via the USB cable. For example, when a communication terminal (for example, a laptop PC or a smartphone) is connected to the USB I/F 105 as the communication terminal 40, the USB I/F 105 transmits and receives control signals, video signals, and electric power to and from the communication terminal. Further, for example, when an external power supply is connected to the USB I/F 105 as the communication terminal 40, the USB I/F 105 receives electric power supplied from the external power supply.

The display apparatus 20 often includes a plurality of USB I/Fs 105, and the communication terminal 40 can be connected to each of the USB I/Fs 105. Although only one USB I/F 105 is illustrated in FIG. 3 to simplify the drawing, the display apparatus 20 may be provided with two or more USB I/Fs 105.

The HDMI 111 is an interface for connecting the communication terminal 40. The HDMI 111 includes an HDMI port 111A compliant with the HDMI standard, and an HDMI cable such as the video cable 110 is connected to the HDMI port 111A. Accordingly, the HDMI 111 is connected to the communication terminal 40 via the HDMI cable. For example, when a communication terminal (for example, a laptop PC or a smartphone) is connected to the HDMI 111 as the communication terminal 40, the HDMI 111 transmits and receives control signals, video signals, and electric power to and from the communication terminal.

The power supply 107 controls the supply of electric power to each component of the display apparatus 20 to drive each component. For example, when the electric power is not supplied from the communication terminal 40 (such as an external power supply or a communication terminal) or when the electric power supplied from the communication terminal 40 (such as an external power supply or a communication terminal) is insufficient, the power supply 107 can supply the electric power stored in the battery 108 to each component of the display apparatus 20. Further, for example, when the electric power is supplied from the communication terminal 40 (such as an external power supply or a communication terminal), the power supply 107 can supply the electric power supplied from the communication terminal 40 to each component of the display apparatus 20. Furthermore, for example, the power supply 107 can pass through the electric power supplied from the communication terminal 40 (such as an external power supply or a communication terminal) connected to the USB I/F 105 or the HDMI 111 and supply the electric power to another communication terminal 40 (such as a communication terminal) connected to another USB I/F 105 or HDMI 111.

The battery 108 stores electric power to drive the display apparatus 20. Various kinds of rechargeable secondary batteries (for example, a lithium-ion battery and a lithium polymer battery) are usable as the battery 108. The display apparatus 20 (for example, the power supply 107) can charge the battery 108 with the electric power supplied from the communication terminal 40 (such as an external power supply or a communication terminal) connected to the USB I/F 105 or the HDMI 111.

Figure 4:
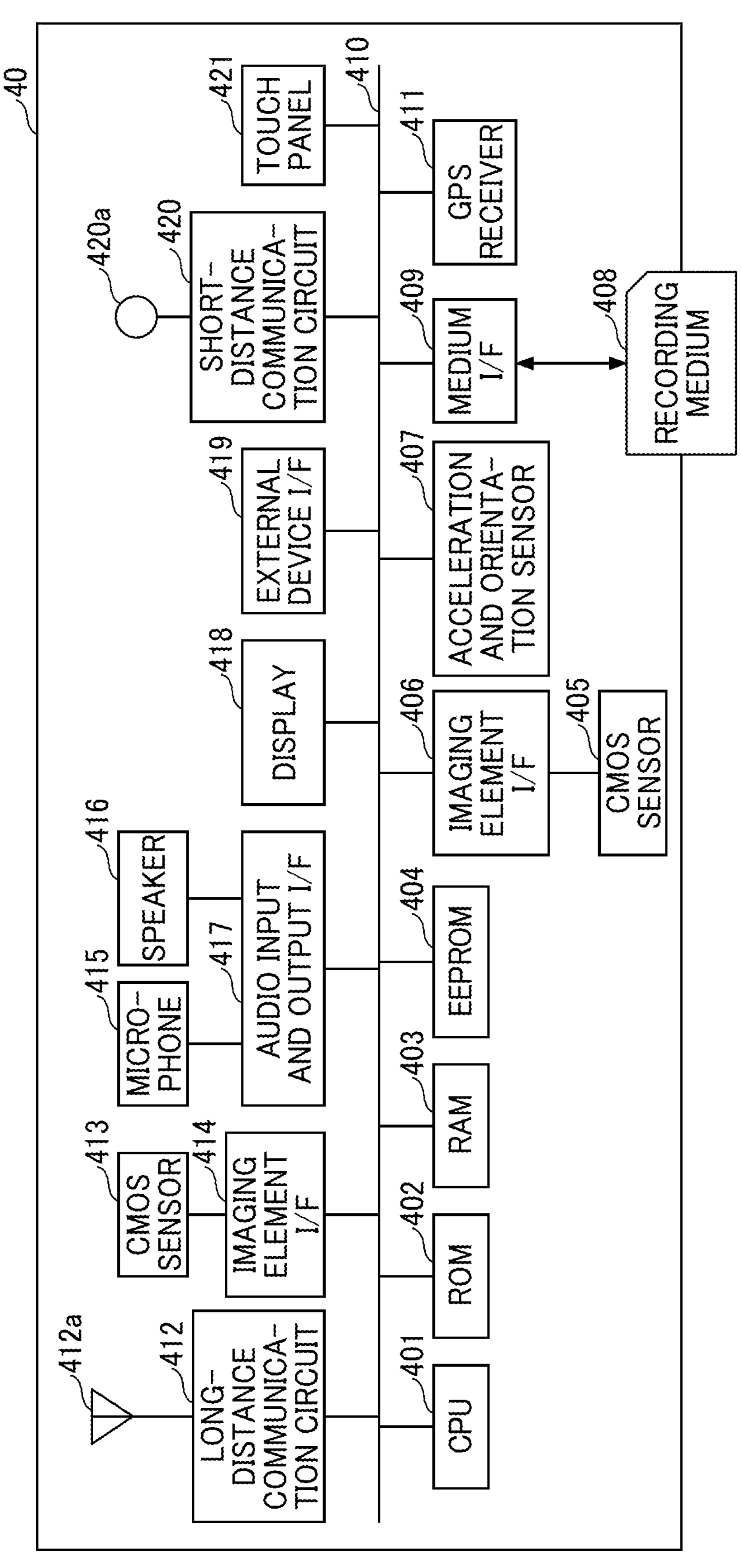
FIG. 4 is a block diagram illustrating a hardware configuration of a communication terminal according to an embodiment of the present disclosure.

FIG. 4 is a block diagram illustrating a hardware configuration of the communication terminal 40 according to an embodiment of the present disclosure.

In FIG. 4, by way of example, a smartphone is used as the communication terminal 40. As illustrated in FIG. 4, the communication terminal 40 includes a CPU 401, a ROM 402, a RAM 403, an electrically erasable programmable read-only memory (EEPROM) 404, a complementary metal oxide semiconductor (CMOS) sensor 405, an imaging element I/F 406, an acceleration and orientation sensor 407, a medium I/F 409, and a global positioning system (GPS) receiver 411.

The CPU 401 controls the entire operation of the communication terminal 40. The ROM 402 stores a program such as an initial program loader (IPL) to boot the CPU 401. The RAM 403 is used as a work area for the CPU 401.

The EEPROM 404 reads or writes various data such as a program for the communication terminal 40 under the control of the CPU 401.

The CMOS sensor 405 is a kind of built-in imaging device that captures an image of an object (typically, a self-image of the operator) under the control of the CPU 401 to obtain the image data. In alternative to the CMOS sensor, an imaging element such as a charge-coupled device (CCD) sensor may be used.

The imaging element I/F 406 is a circuit that controls the driving of the CMOS sensor 405. The acceleration and orientation sensor 407 serves as various sensors such as, for example, an electromagnetic compass for detecting geomagnetism, a gyrocompass, and an acceleration sensor.

The medium I/F 409 controls the reading and writing (storing) of data from and to a recording medium 408 such as a flash memory. The GPS receiver 411 receives a GPS signal from a GPS satellite.

The communication terminal 40 includes a long-range communication circuit 412, a CMOS sensor 413, an imaging element I/F 414, a microphone 415, a speaker 416, an audio input and output I/F 417, a display 418, an external device I/F 419, a short-range communication circuit 420, an antenna 420*a* of the short-range communication circuit 420, and a touch panel 421.

The long-range communication circuit 412 is a circuit for communicating with other devices via a wired or wireless network. The long-range communication circuit 412 can perform wireless communication using, for example, Wi-Fi. The CMOS sensor 413 is a kind of built-in imaging device that captures an image of an object under the control of the CPU 401 to obtain the image data.

The imaging element I/F 414 is a circuit that controls the driving of the CMOS sensor 413. The microphone 415 is a built-in circuit that converts audio into electrical signals.

The speaker 416 is a built-in circuit that converts electrical signals into physical vibrations to generate audio such as music or voice. The audio input and output I/F 417 is a circuit that processes the input and output of audio signals between the microphone 415 and the speaker 416 under the control of the CPU 401.

The display 418 is a kind of display that displays an image of an object and various icons, such as a liquid crystal display or an organic EL display. The external device I/F 419 is an interface for connection with various external devices.

The short-range communication circuit 420 is a communication circuit in compliance with, for example, the near field communication (NFC) or BLUETOOTH. The touch panel 421 is a kind of input device that allows the operator to operate the communication terminal 40 by touching a screen of the display 418.

The communication terminal 40 includes a bus line 410. The bus line 410 is, for example, an address bus or a data bus, which electrically connects the components or elements such as the CPU 401 illustrated in FIG. 4.

FIG. 5 is a block diagram illustrating functional configurations of the communication terminal 40 and the display apparatus 20, according to an embodiment of the present disclosure.

As illustrated in FIG. 5, the communication terminal 40 includes a playback unit 41, a display control unit 42, an operation reception unit 43, a wired communication unit 44, a wireless communication unit 45, and a screen data acquisition unit 46. These functional units included in the communication terminal 40 provide functions implemented by the CPU 401 illustrated in FIG. 4 executing instructions included in one or more programs installed on the communication terminal 40. The one or more programs are, for example, a playback application 301 and a mirroring application 302. The playback application 301 is an application that plays back various contents. However, since the communication terminal 40 can transmit the very screen displayed on the display 418, the playback application 301 may not be needed. The mirroring application 302 is an application that acquires (captures) a screen displayed on the display 418 and transmits the screen to the display apparatus 20. There is no problem even if the playback application 301 and the mirroring application 302 are integrated.

The playback unit 41 decodes or expands video data that has a data format specific to a video to reconstruct the video into a frame (an image corresponding to one screen). In addition, the playback unit 41 can change the resolution of an image in accordance with the resolution of a display panel and interpolate frames.

The display control unit 42 displays the frame generated by the playback unit 41 on the display panel 102. The frame rate is, for example, between 30 frames per second and 120 frames per second.

The operation reception unit 43 receives operations to the playback application 301 performed by the operator. The operations that the operation reception unit 43 receives are operations relating to the playback of a video, for example, starting or stopping the playback of the video, going back or going forward the video by a certain number of seconds, adjusting the audio volume, and adjusting the brightness. The operation reception unit 43 receives operations similar to the above-described operations in response to touch signals received by the wired communication unit 44 or the wireless communication unit 45 from the display apparatus 20. The operation reception unit 43 receives operations for the wireless connection setting of the communication terminal 40 performed by the operator.

The screen data acquisition unit 46 acquires (captures), as screen data, an entirety or a part (a portion of the contents of the playback application, a desired application, or an area designated by the operator) of the screen displayed on the display 418 at a certain speed (the number of vibration frequencies per second).

The wired communication unit 44 repeatedly transmits the screen data acquired by the screen data acquisition unit 46 to each of the display apparatuses 20 using a video cable such as the HDMI cable, the USB cable, or a DISPLAYPORT cable.

The wireless communication unit 45 repeatedly transmits the screen data acquired by the screen data acquisition unit 46 to each of the display apparatuses 20 using wireless communication such as Wi-Fi or BLUETOOTH.

The speed at which the wireless communication unit 45 or the wired communication unit 44 transmits the screen data to one of the display apparatuses 20 (the number of pieces of screen data transmitted per second) is referred to as a transmission frame rate.

Subsequently, the display apparatus 20 is described below. The functions of the display apparatus 20 are typically arranged in three layers. The three layers are a hardware control layer 30, an operating system (OS) 27, and a connection application layer 39 in this order from the bottom. Although other applications may operate on the OS 27, only major applications are described in the present embodiment.

The hardware control layer 30 includes a touch control unit 28, a wireless connection control unit 29, a wired connection control unit 31, a video and audio control unit 32, and a power supply control unit 33. These functions of the hardware control layer 30 may be implemented by, for example, a device driver.

The touch control unit 28 converts the signal input from the touch sensor 102*a* into coordinates (X and Y coordinates with the upper left corner of the display panel 102 as an origin, for example) and outputs the coordinates to the OS 27. The touch control unit 28 may further convert the signal into a touched area or a pressure included in the signal, and output the converted signal to the OS 27.

The wireless connection control unit 29 performs, for example, filtering, amplification, demodulation, and analog to digital (A/D) conversion on radio waves of the wireless communication received by the communication I/F 103 to convert the radio waves into digital signals. Then, the wireless connection control unit 29 decapsulates the digital signals according to the communication protocol, and obtains data. The wireless connection control unit 29 outputs the data to the OS 27. This data is video data and audio data transmitted from the communication terminal 40. The wireless connection control unit 29 obtains data from the OS 27 and performs encapsulation of the data according to the communication protocol, digital to analog (D/A) conversion, modulation, and amplification to convert the data into radio waves. Then, the wireless connection control unit 29 transmits the radio waves of the wireless communication through the communication I/F 103. This data is a touch signal according to an embodiment of the present disclosure.

The wired connection control unit 31 decodes the compressed video data and audio data included in signals received by the USB I/F 105 or the HDMI 111 via the wired cable. The wired connection control unit 31 detects a horizontal synchronization signal and a vertical synchronization signal included in the video data to generate a segment of the scanning line for the video, and outputs the video data for display to the OS 27. The wired connection control unit 31 obtains the data from the OS 27 and transmits the data to the communication terminal 40 from a predetermined pin terminal via the wired cable. This data is another touch signal according to an embodiment of the present disclosure.

The video and audio control unit 32 converts the video data obtained from the OS 27 into a format supported by the display panel 102, such as a red-green-blue (RGB) format, and stores the converted data in a video memory. The video and audio control unit 32 applies a voltage to the individual cells of the display panel 102 according to the video data obtained from the video memory. The video and audio control unit 32 generates a differential signal from the audio data obtained from the OS 27, and outputs the differential signal to the positive terminal and the negative terminal of the speaker.

The power supply control unit 33 controls the power supply from the battery or the power supply from the external power supply in accordance with the shutdown processing from the OS 27 or the input status of the power switch of the display apparatus or the external power supply. In the case where surplus power is available from the external power supply, the power supply control unit 33 charges the battery. The power supply control unit 33 manages the amount of the battery.

The power supply control unit 33 controls the transition to the power-saving mode and the return from the power-saving mode as forms of power supply control. The power supply control differs depending on whether the input setting is set to the wireless connection or the wired connection. The details are described later.

The connection application layer 39 includes a first communication unit 21, a second communication unit 22, an operation reception unit 23, an output unit 24, a switching unit 25, and a changing unit 26. These functional units included in the connection application layer 39 provide functions implemented by the CPU of the controller 101 executing instructions included in the connection application layer 39.

The first communication unit 21 receives video data and audio data via the wired connection control unit 31, and transmits the video data and the audio data to the output unit 24. Also, the first communication unit 21 transmits the touch signal received by the operation reception unit 23 via the wired connection control unit 31 to the communication terminal 40.

The second communication unit 22 transmits a service set identifier (SSID) and an encryption key to the wireless connection control unit 29 to instruct the wireless connection control unit 29 to start, maintain, or terminate the wireless communication with the communication terminal 40. The second communication unit 22 receives video data and audio data via the wireless connection control unit 29, and transmits the video data and the audio data to the output unit 24. Also, the second communication unit 22 transmits the touch signal received by the operation reception unit 23 via the wireless connection control unit 29 to the communication terminal 40. The second communication unit 22 may communicate directly with the communication terminal 40 or may communicate with the communication terminal 40 via the access point 8.

The operation reception unit 23 receives a touch operation on a video input from the communication terminal 40 and a touch operation on an icon. In the case where the coordinates of the touched position are in the range of the circumscribed rectangle of the icon, the operation reception unit 23 receives the pressing of the icon. In the case where the coordinates of the touched position are not in the range of the circumscribed rectangle of the icon but in the display range of the video, the operation reception unit 23 receives the operation (such as handwriting input or a button operation) to the communication terminal 40. The coordinates of the touched position in the display range of the video are transmitted to the communication terminal 40 as a touch signal. The coordinates of the touched position in the range of the circumscribed rectangle of the icon are received as an operation to the display apparatus 20.

In the case of the operation to the communication terminal 40, the first communication unit 21 or the second communication unit 22 transmits the touch signal to the communication terminal 40. The touch signal in this case is a signal obtained by converting the coordinates of the touched position on the display apparatus 20 into coordinates in an effective pixel region of the display 418 of the communication terminal 40. The converted coordinates are expressed, for example, as a ratio of the X coordinate to the width and a ratio of the Y coordinate to the height of the video (an image) displayed on the display apparatus 20.

The output unit 24 obtains at least one of the video data and the audio data received by the first communication unit 21 or the second communication unit 22 from the communication terminal 40, and controls the output of the video data and the audio data from the video and audio control unit 32. The output unit 24 displays the video input from the communication terminal 40 on the display layer for displaying a source video and outputs the audio from the speaker 109.

The switching unit 25 includes an input setting 25*a*. In the input setting 25*a*, the "wireless connection" or the "wired connection" is set. The switching unit 25 automatically switches the input setting 25*a*. In other words, the input setting 25*a* is set manually by the operator, and is also switched automatically in a predetermined case. The switching unit 25 automatically switches the input setting 25*a* at the time of activation or at the time of reception of video or audio. The location where the input setting 25*a* is provided is not limited to the switching unit 25. As far as the display apparatus 20 includes the input setting 25*a*, the input setting 25*a* may be provided in, for example, the OS 27, the wireless connection control unit 29, or the wired connection control unit 31.

The output unit 24 outputs, based on the input setting 25*a*, the video received via the wireless connection or the video received via the wired connection. When the input setting 25*a* is set to the wired connection, the output unit 24 outputs the video and the audio received by the first communication unit 21. When the input setting 25*a* is set to the wireless connection, the output unit 24 outputs the video and the audio received by the second communication unit 22.

When the input setting 25*a* is set to the wireless connection, the changing unit 26 changes the transition condition for the power supply control unit 33 to cause the display apparatus 20 to shift to the power-saving mode. Changing the transition condition includes the transition condition not shifting to the power-saving mode. The details are described later.

Referring to FIG. 6, the transition and the return of the power supply status are described below as a comparative technique. The comparative technique according to the present embodiment is a technique to be compared with the technique described in the present embodiment, and is not necessarily a technique in the related art.

FIG. 6 is a diagram illustrating statuses of the power supply of the display apparatus 20, a transition condition to shift to the power-saving mode, and a return condition to return from the power-saving mode, according to an embodiment of the present disclosure.

As illustrated in FIG. 6, it is assumed that the display apparatus 20 has two power supply statuses of an output-enabled mode 220 and a power-saving mode 230. The output-enabled mode 220 is a power supply status in which video or audio can be output regardless of whether or not the video or the audio is actually being output. In addition, in the output-enabled mode 220, the luminance of the display panel 102 is normal. The power-saving mode is a power supply status in which the power is consumed less than in the output-enabled mode 220. In the present embodiment, the power-saving mode is a power supply status in which the wireless connection is disabled. In addition, in the power-saving mode 230, the luminance of the display panel 102 is lower than the luminance under normal operating conditions.

The display apparatus 20 may separately have the elements of the power-saving mode 230 as a power supply status of another mode. For example, one mode is the power-saving mode 230 in which the luminance of the display panel 102 is lowered and the other mode is another power-saving mode in which the wireless connection is disabled. In the present embodiment, since one of the features is to restrict transition to a status in which the wireless connection is disabled, the display apparatus 20 has only one power-saving mode that is the power-saving mode 230.

According to the comparative technique, the transition condition to shift to the power-saving mode and the return condition to return from the power-saving mode remain unchanged regardless of whether the input setting 25*a* is set to the wired connection or the wireless connection as described below.

The transition condition to shift to the power-saving mode 230 from the output-enabled mode 220 is no operation and no video input via the wired connection or the wireless connection for a certain period of time.

It is preferable that a certain period of time be set by the operator. Such a certain period of time is, for example, between 30 seconds to several minutes, and may be set so as to be easy for the operator to use and to obtain a power saving effect.

The return condition to return to the output-enabled mode 220 from the power-saving mode 230 is video input via the wired connection or an operation by the operator.

These elements of the conditions are merely given by way of example. Another element may be added to the transition condition or the return condition, or the transition condition or the return condition may be relaxed. As described above, the display apparatus 20 returns to the output-enabled mode 220 by the video input via the wired connection when the input setting 25*a* is set to the wireless connection. This is because the communication terminal 40 cannot connect the display apparatus 20 via the wireless connection in the power-saving mode 230.

Referring to FIGS. 7A and 7B, a transition condition and a return condition according to the comparative technique are described below.

FIGS. 7A and 7B are flowcharts of the processing performed by the display apparatus 20 to shift to the power-saving mode 230 from the output-enabled mode 220 and return to the output-enabled mode 220 from the power-saving mode 230, according to the comparative technique.

The processing illustrated in FIGS. 7A and 7B starts when the display apparatus 20 is powered on and activated.

When the display apparatus 20 is powered on and activated, in step S1, the wireless connection control unit 29 starts operation. Accordingly, the wireless connection control unit 29 starts wireless communication to repeatedly transmit, for example, the identification information, the internet protocol (IP) address, and the media access control (MAC) address of the own apparatus in order to notify other devices of the presence of the own apparatus. These information and data are transmitted in a form that can be decoded by a mirroring application corresponding to the display apparatus 20. The wireless communication is received and the presence of the display apparatus 20 is detected by any mirroring application.

In step S2, the power supply control unit 33 checks the input setting 25*a* set in the switching unit 25. In the input setting 25*a* at the time of activation, whether the input setting 25*a* is set to the wireless connection or the wired connection at the time of the power off of the display apparatus 20 is automatically stored.

When the input setting 25*a* is set to the wireless connection, in step S3, the power supply control unit 33 determines whether the wireless connection control unit 29 receives a connection request from the communication terminal 40. The connection request refers to, for example, inquiring whether the connection can be established at present by transmitting, for example, the version of the mirroring application, the encryption method supported by the communication terminal 40, the compression method, or the frame rate to the display apparatus 20.

The communication terminal 40 is connected to the display apparatus 20 by the operator making a wireless connection setting for the communication terminal 40. The wireless connection setting varies depending on the OS of the communication terminal 40 or the mirroring application. For example, the operator instructs the communication terminal 40 to display a list of the display apparatuses 20 that are notifying other devices of the presence of themselves, and selects a desired one of the display apparatuses 20 in the list.

When no connection request is determined to be received (NO in S3), in step S4, the power supply control unit 33 determines whether no operation is received and a certain period of time has elapsed in a status where no video is input via the wired connection or the wireless connection. When a certain period of time is determined not to have elapsed (NO in S4), the processing proceeds to step S12.

When a certain period of time is determined to have elapsed (YES in S4), in step S5, the power supply control unit 33 causes the display apparatus 20 to shift to the power-saving mode.

Subsequently, in step S6, the power supply control unit 33 determines whether the return condition is satisfied. When the return condition is determined not to be satisfied (NO in S6), the processing returns to step S5. When the return condition is determined to be satisfied (YES in S6), the processing returns to step S1.

When the connection request is determined to be received (YES in S3), in step S7, the power supply control unit 33 determines whether the wireless connection control unit 29 establishes the connection with the communication terminal 40. The establishment of a connection refers to, for example, establishing a connection before data transmission starts. That is, three-way handshaking is successfully performed at the transmission control protocol (TCP) layer. When the connection with the communication terminal 40 is determined not to be established (NO in S7), the processing proceeds to step S12.

When the connection with the communication terminal 40 is determined to be established (YES in S7), in step S8, the power supply control unit 33 determines whether the second communication unit 22 receives video or audio from the communication terminal 40 via the wireless connection control unit 29. Since the data (an IP packet) of the video or the audio includes data type information indicating that the data is video or audio, for example, the second communication unit 22 can determine that the data is the data of the video or the audio or the data of something else. When no video or audio is determined to be input (NO in S8), the processing proceeds to step S4.

When the video or the audio is determined to be input (YES in S8), the second communication unit 22 transmits the video or the audio to the output unit 24. Then, the output unit 24 transmits the video or the audio to the video and audio control unit 32. Further, in step S9, the video and audio control unit 32 displays the video (that serves as the second video) on the display panel 102 or outputs the audio from the speaker.

While the video or the audio is output, in step S10, the operation reception unit 23 determines whether switching of the input setting 25*a* is received. As will be described in a dialog box 200 for switching the input setting to be described later, the input setting 25*a* can be switched by the operator. When switching of the input setting 25*a* is determined not to be received (NO in S10), the processing returns to step S8.

When switching of the input setting 25*a* is determined to be received (YES in S10), in step S11, the switching unit 25 switches the input setting 25*a* to the wired connection. As a result, as far as the video or the audio is being input via the wired connection, the first communication unit 21 transmits the video or the audio to the output unit 24. Then, the output unit 24 transmits the video or the audio to the video and audio control unit 32. Further, the video and audio control unit 32 displays the video on the display panel 102 or outputs the audio from the speaker.

In step S12, the operation reception unit 23 determines whether switching of the input setting 25*a* is received. The processing of S12 may be the same as the processing of S10.

When switching of the input setting 25*a* is determined to be received (YES in S12), in step S13, the switching unit 25 switches the input setting 25*a* to the wired connection. The processing of S13 may be the same as the processing of S11.

Referring back to step S2, the description continues. When the input setting 25*a* is set to the wired connection, in step S21, the power supply control unit 33 determines whether the first communication unit 21 receives video or audio via the wired connection control unit 31. For example, in the case of the HDMI cable, a transition minimized differential signaling (TMDS) pin serves as a video and audio pin. The wired connection control unit 31 detects an input of video and audio depending on whether a signal is input to the TMDS pin. The first communication unit 21 receives the video and the audio.

When the video or the audio is determined to be received (YES in S21), the first communication unit 21 transmits the video or the audio to the output unit 24. Then, the output unit 24 transmits the video or the audio to the video and audio control unit 32. Further, in step S22, the video and audio control unit 32 displays the video (that serves as the first video) on the display panel 102 or outputs the audio from the speaker.

While the video or the audio is output, in step S23, the operation reception unit 23 determines whether switching of the input setting 25*a* is received. The processing of S23 may be the same as the processing of S10. When switching of the input setting 25*a* is determined not to be received (NO in S23), the processing returns to step S21.

When switching of the input setting 25*a* is determined to be received (YES in S23), in step S24, the switching unit 25 switches the input setting 25*a* to the wireless connection. As a result, as far as the video or the audio is input via the wireless connection, the second communication unit 22 transmits the video or the audio to the output unit 24. Then, the output unit 24 transmits the video or the audio to the video and audio control unit 32. Further, the video and audio control unit 32 displays the video on the display panel 102 or outputs the audio from the speaker. Subsequently, the processing returns to step S2.

When the video or the audio is determined not to be input (NO in S21), in step S25, the power supply control unit 33 determines whether no operation is determined to be received and a certain period of time has elapsed in a status where no video is input via the wired connection or the wireless connection. When a certain period of time is determined not to have elapsed (NO in S25), the processing proceeds to step S28.

When a certain period of time is determined to have elapsed (YES in S25), in step S26, the power supply control unit 33 causes the display apparatus 20 to shift to the power-saving mode.

Subsequently, in step S27, the power supply control unit 33 determines whether the return condition is satisfied. When the return condition is determined not to be satisfied (NO in S27), the processing returns to step S26. When the return condition is determined to be satisfied (YES in S27), the processing returns to step S1.

When a certain period of time is determined not to have elapsed (NO in S25), in step S28, the operation reception unit 23 determines whether switching of the input setting 25*a* is received. The processing of S28 may be the same as the processing of S10. When switching of the input setting 25*a* is determined not to be received (NO in S28), the processing returns to step S2.

When switching of the input setting 25*a* is determined to be received (YES in S28), in step S29, the switching unit 25 switches the input setting 25*a* to the wireless connection. The processing of S29 may be the same as the processing of S24.

As described above, according to the comparative technique, when the result of the determination is No in step S3 or S8 and a certain period of time is determined to have elapsed, the display apparatus 20 shifts to the power-saving mode. While the operator takes time to set up the wireless connection of the communication terminal 40, the display apparatus 20 may shift to the power-saving mode and become unable to be connected via the wireless connection.

FIG. 8 is a diagram illustrating the dialog box 200 for switching the input setting displayed by the display apparatus 20 according to an embodiment of the present disclosure.

As illustrated in FIG. 8, the communication terminal 40 wirelessly communicates with the display apparatus 20. The communication terminal 40 displays a video on the display 418, and transmits the video being displayed to the display apparatus 20. Since the display apparatus 20 displays the video on the display panel 102, the operator can view the video on a relatively large screen.

The output unit 24 outputs a setting icon 10 on the screen. When the operator desires to change the input setting 25*a*, the operator presses the setting icon 10 to call up a menu for changing the input setting 25*a*. Accordingly, the dialog box 200 for switching the input setting is displayed. The dialog box 200 for switching the input setting includes a message 201 indicating "Do you want to switch the input setting?", a wireless connection button 202, and a wired connection button 203. The current setting of the input setting 25*a* is reflected and highlighted on the wireless connection button 202 or the wired connection button 203. After checking the current setting, the operator can change the input setting 25*a* by pressing the wireless connection button 202 or the wired connection button 203. The input setting 25*a* set by the operator is stored in the switching unit 25, for example.

The dialog box 200 for switching the input setting is automatically deleted when the operator presses the wireless connection button 202 or the wired connection button 203, or when the elapsed time from the display of the dialog box 200 for switching the input setting exceeds a threshold value.

The input setting 25*a* may be set by an operation to the hard key 104 instead of the soft key as illustrated in FIG. 8.

Figure 10A:
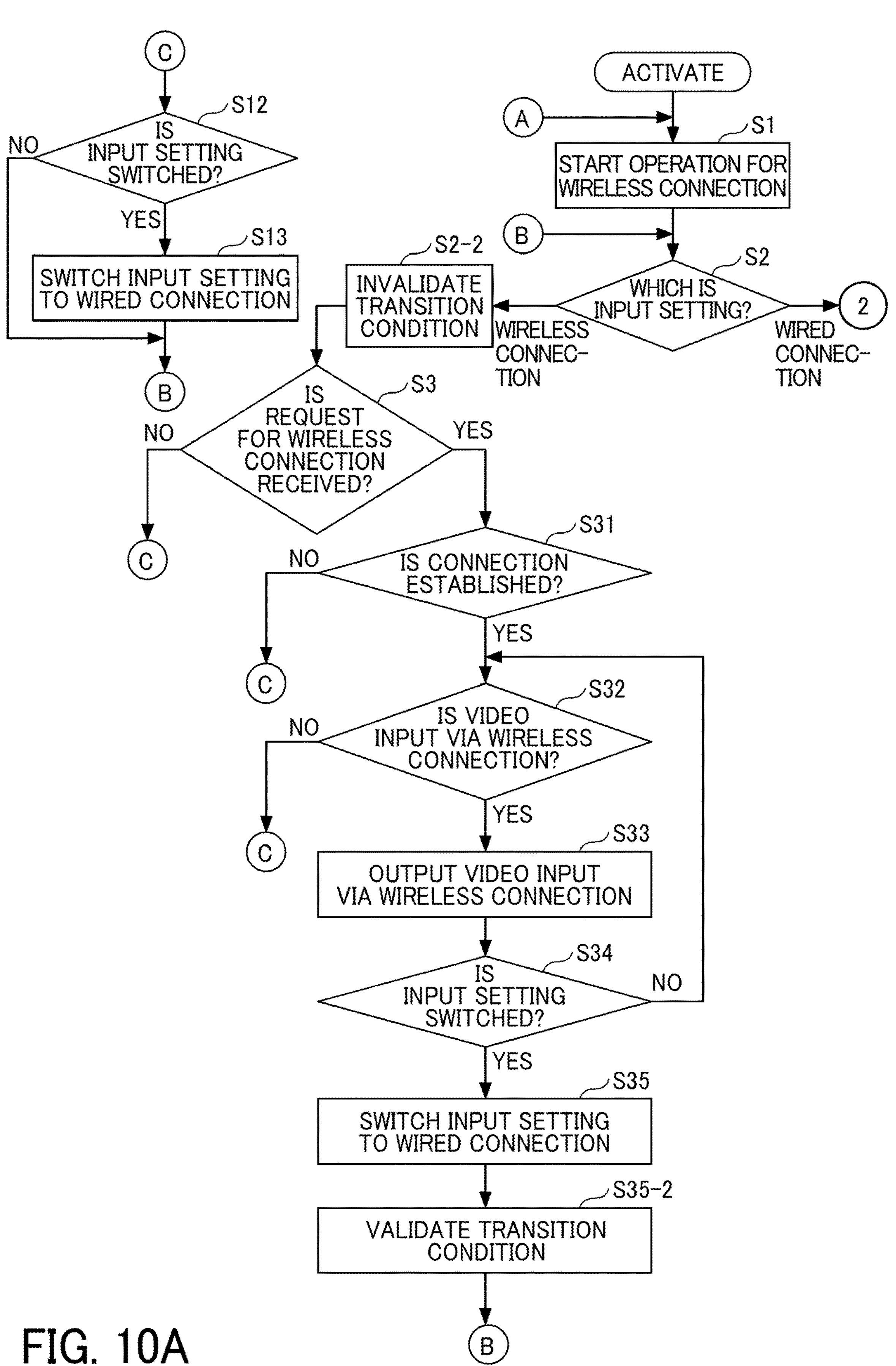
FIGS. 10A and 10B are flowcharts of the first processing performed by a display apparatus, which once restricted from shifting to a power-saving mode, to shift to the power-saving mode from an output-enabled mode and to return to the output-enabled mode from the power-saving mode, according to an embodiment of the present disclosure.
Figure 10B:
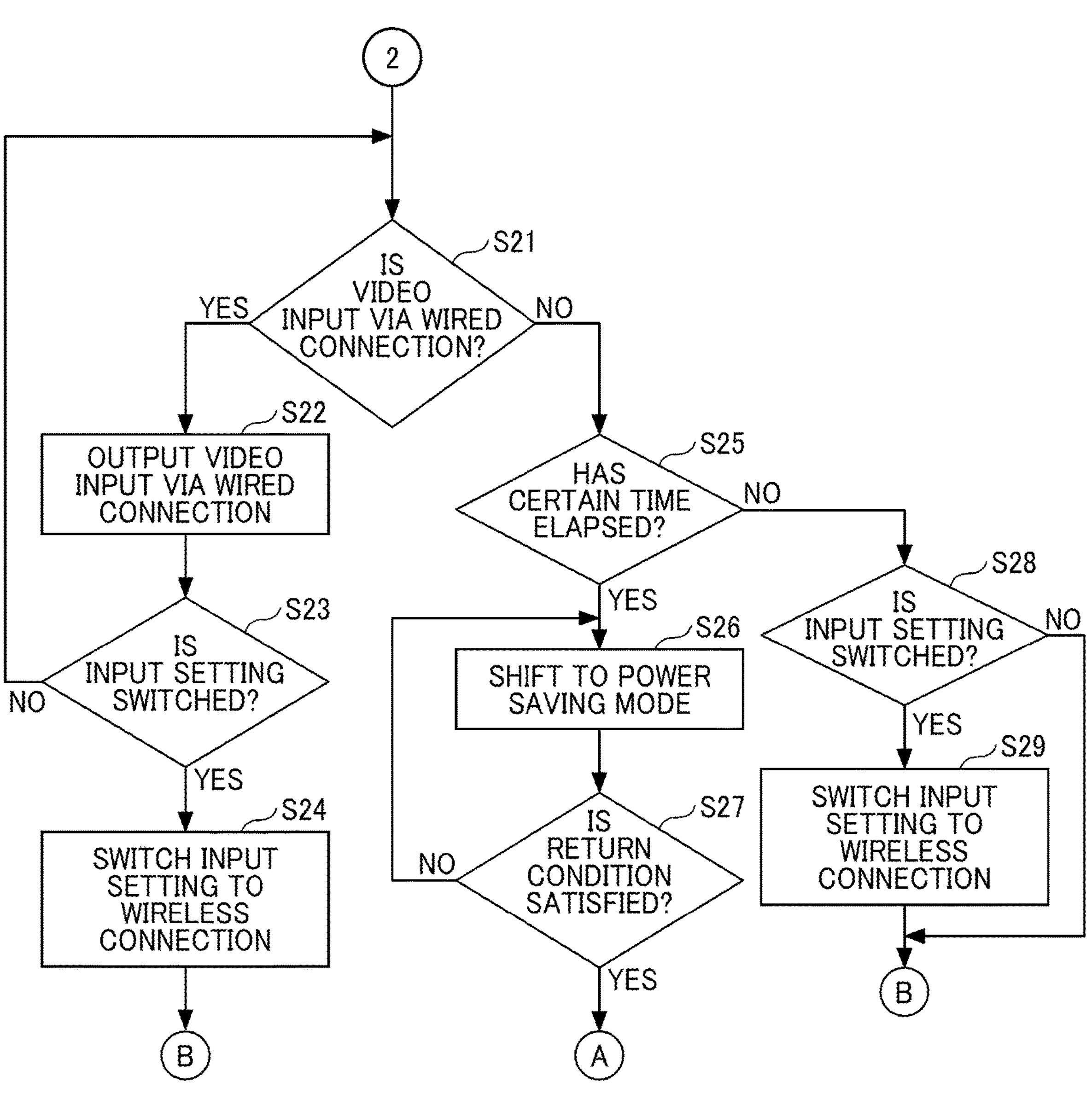

Referring to FIGS. 9, 10A, and 10B, a transition condition and a return condition according to the present embodiment are described below.

FIG. 9 is a diagram illustrating statuses of the power supply of the display apparatus 20, another transition condition to shift to the power-saving mode, and another return condition to return to the power-saving mode when the input setting 25*a* is set to the wireless connection, according to an embodiment of the present disclosure.

In the description with reference to FIG. 9, for simplicity, the differences from FIG. 6 are described. The transition condition and the return condition in the case of the wired connection in FIG. 9 may be the same as those in FIG. 6.

As illustrated in FIG. 9, when the input setting 25*a* is set to the wireless connection, the power supply control unit 33 does not cause the display apparatus 20 to shift to the power-saving mode 230. In other words, the display apparatus 20 does not shift to the power-saving mode 230 even when no operation is determined to be received and no video is determined to be input via the wired connection or the wireless connection for a certain period of time. In this way, the display apparatus 20 is restricted from shifting to the power-saving mode and being unable to be connected via the wireless connection while the operator takes time to set up the wireless connection of the communication terminal 40. When the remaining battery level of the display apparatus 20 is equal to or lower than a threshold value, the display apparatus 20 preferably shifts to the power-saving mode as an exception.

FIGS. 10A and 10B are flowcharts of the first processing performed by the display apparatus 20, which once restricted from shifting to the power-saving mode 230, to shift to the power-saving mode 230 from the output-enabled mode 220 and return to the output-enabled mode 220 from the power-saving mode 230, according to an embodiment of the present disclosure.

In the description with reference to FIGS. 10A and 10B, for simplicity, the differences from FIGS. 7A and 7B are described.

The processing of steps S1, S2, and S3 of the flowchart in FIG. 10A is substantially the same as the processing of steps S1, S2, and S3 of the flowchart in FIG. 7A. Also, the processing of steps S31 to S35 of the flowchart in FIG. 10A is substantially the same as the processing of steps S7 to S11 of the flowchart in FIG. 7A. However, there are some differences as described below.

In step S2, the changing unit 26 checks the input setting 25*a* set in the switching unit 25. When the input setting 25*a* is set to the wireless connection, in step S2-2, the changing unit 26 invalidates the transition condition to shift to the power-saving mode 230. Accordingly, as will be described below with reference to the flowchart of FIGS. 10A and 10B, the power supply control unit 33 does not cause the display apparatus 20 to shift to the power-saving mode 230.

When the result of the determination is No in step S3, the processing proceeds to step S12. As a result, even when no connection request is determined to be received, the display apparatus 20 does not shift to the power-saving mode 230.

When the result of the determination is No in step S31, the processing proceeds to step S12. As a result, even when the connection with the communication terminal 40 is determined not to be established, the display apparatus 20 does not shift to the power-saving mode 230.

When the result of the determination is No in step S32, the processing proceeds to step S12. As a result, even when no video or audio is determined to be input, the display apparatus 20 does not shift to the power-saving mode 230.

In step S35, when the input setting 25*a* is switched to the wired connection, in step S35-2, the changing unit 26 validates the transition condition to shift to the power-saving mode 230 that is invalidated. In this way, when the input setting 25*a* is set to the wired connection, the power supply control unit 33 can shift to the power-saving mode 230.

The processing of steps S21 to S29 of the flowchart for the control in the wired connection in FIG. 10B is substantially the same as the processing of steps S21 to S29 of the flowchart in FIG. 7B. However, when the input setting 25*a* is switched to the wireless connection in step S24 or S29, the changing unit 26 may change the transition condition (invalidate the transition condition) at this timing. Even when the transition condition is not changed in step S24 or S29, the transition condition is changed in step S2-2. For this reason, the transition condition is not necessarily changed in step S24 or S29.

According to the transition control in FIG. 10A, the display apparatus 20 does not shift to the power-saving mode 230 in the case of the wireless connection. Thus, even when the operator takes time to set up the wireless connection of the communication terminal 40, the wireless connection of the display apparatus 20 is not disabled.

Figure 12A:
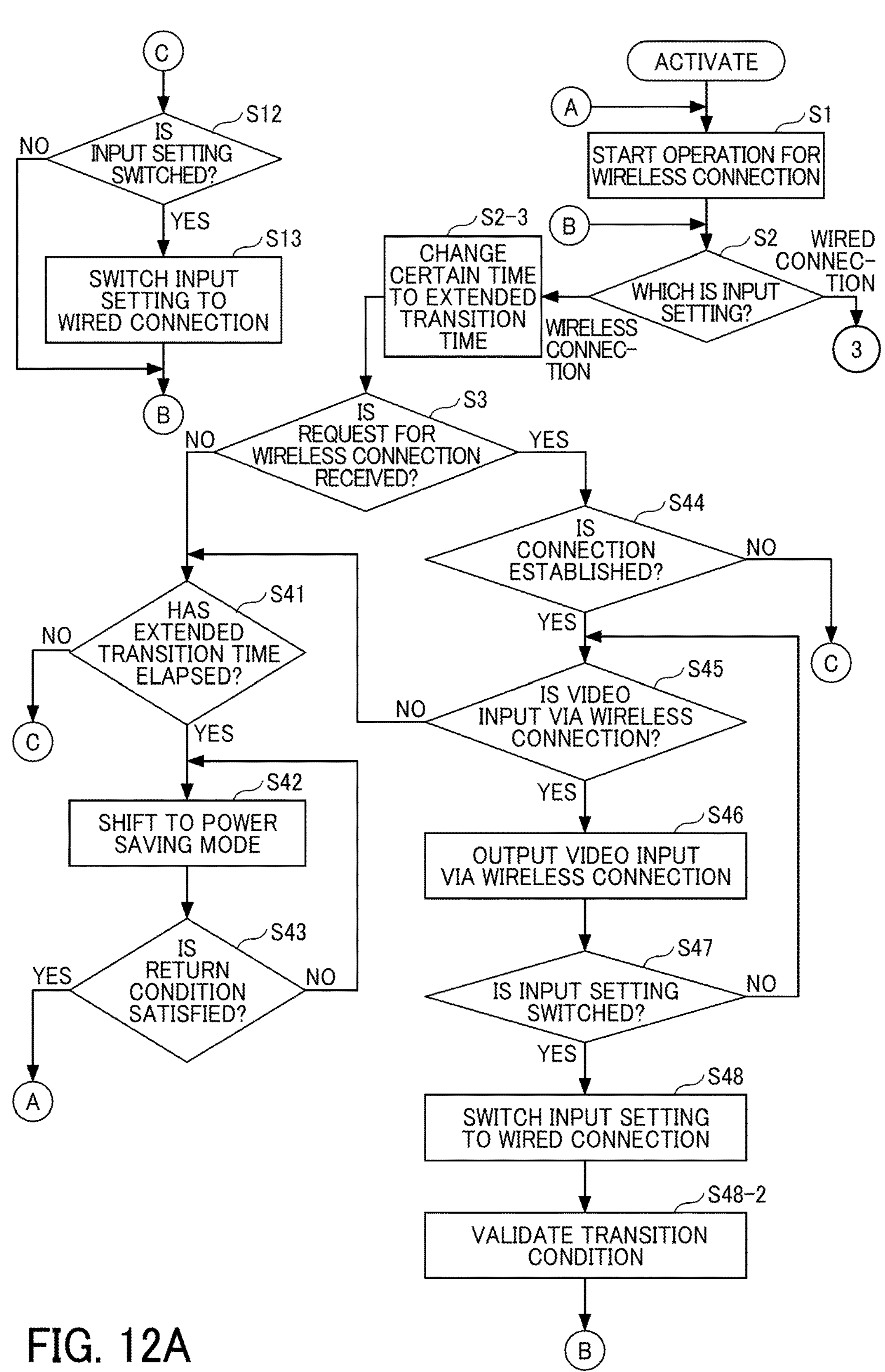
FIGS. 12A and 12B are flowcharts of the second processing performed by a display apparatus, which once restricted from shifting to a power-saving mode, to shift to the power-saving mode from an output-enabled mode and to return to the output-enabled mode from the power-saving mode, according to an embodiment of the present disclosure.
Figure 12B:
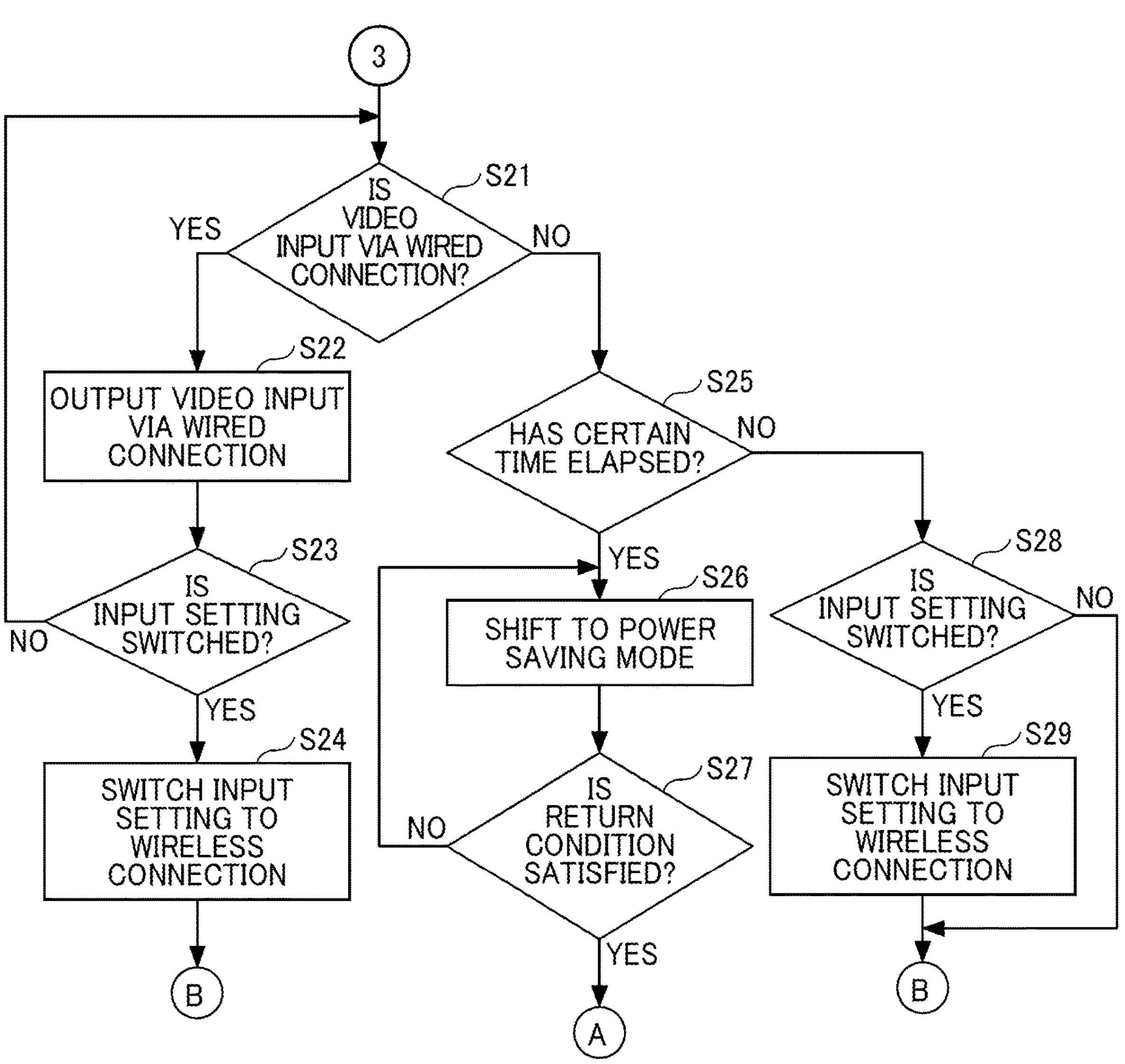

Referring to FIGS. 11, 12A, and 12B, a transition condition and a return condition according to the present embodiment are described below as the second transition control.

FIG. 11 is a diagram illustrating statuses of the power supply of the display apparatus 20, still another transition condition to shift to the power-saving mode, and still another return condition to return to the power-saving mode when the input setting 25*a* is set to the wireless connection, according to an embodiment of the present disclosure.

In the description with reference to FIG. 11, for simplicity, the differences from FIG. 6 are described.

As illustrated in FIG. 11, when the input setting 25*a* is set to the wireless connection, the transition condition is as follows.

The transition condition to shift to the power-saving mode 230 from the output-enabled mode 220 is no operation and no video input via the wired connection or the wireless connection for an extended transition time, which is longer than a certain period of time.

In other words, the display apparatus 20 is further restricted from shifting to the power-saving mode 230 since the certain period of time is extended to the extended transition time. Assuming that the certain period of time is equal to a transition time in the case where the input setting 25*a* is set to the wired connection, the extended transition time is longer than the certain period of time, for example, twice to several times. It is preferable that the extended transition time be set on the display apparatus 20 by the operator. The extended transition time can be appropriately set by the operator in consideration of how long it takes to set up the wireless connection of the communication terminal 40.

The extended transition time may gradually increase. As described above with reference to FIG. 6, the display apparatus 20 shifts to the power-saving mode when a certain period of time is determined to have elapsed. In the present embodiment, when the display apparatus 20 is reactivated in response to an operation performed by the operator immediately after shifting to the power-saving mode, the changing unit 26 increases the certain period of time by a certain amount each time.

In this way, the display apparatus 20 is restricted from shifting to the power-saving mode and being unable to be connected via the wireless connection while the operator takes time to set up the wireless connection of the communication terminal 40. In addition, the electric power is prevented from being consumed without the display apparatus 20 shifting to the power-saving mode 230.

When the remaining battery level of the display apparatus 20 is equal to or lower than the threshold value, it is preferable that the extended transition time be reset to a certain period of time or that the display apparatus 20 immediately shift to the power-saving mode as an exception.

FIGS. 12A and 12B are flowcharts of the second processing performed by the display apparatus 20, which once restricted from shifting to the power-saving mode 230, to shift to the power-saving mode 230 from the output-enabled mode 220 and return to the output-enabled mode 220 from the power-saving mode 230, according to an embodiment of the present disclosure.

In the description with reference to FIGS. 12A and 12B, for simplicity, the differences from FIGS. 7A and 7B are described.

The processing of step S41 in FIG. 12A is different from the processing of step S4 of FIG. 7A. Except for the processing of step S41, the processing of steps S42 to S48 in FIG. 12A is substantially the same as the processing of steps S5 to S11 in FIG. 7A.

In step S2, the changing unit 26 checks the input setting 25*a* set in the switching unit 25. When the input setting 25*a* is set to the wireless connection, in step S2-3, the changing unit 26 changes the certain period of time, which is a part of the transition condition to shift to the power-saving mode 230, to the extended transition time that is longer than the certain period of time. Accordingly, as will be described below with reference to the flowchart illustrated in FIGS. 12A and 12B, the time until the power supply control unit 33 determines that the transition condition is satisfied becomes longer.

In step S41, the power supply control unit 33 determines whether no operation is received and the extended transition time has elapsed in a status where no video is input via the wired connection or the wireless connection. When the extended transition time is determined to have elapsed (YES in S41), in step S42, the power supply control unit 33 causes the display apparatus 20 to shift to the power-saving mode.

When the input setting 25*a* is switched to the wired connection in step S48, in step S48-2, the changing unit 26 validates the transition condition to shift to the power-saving mode 230 that is invalidated. In other words, the changing unit 26 restores the extended transition time to a certain period of time. In this way, in the case of the input setting 25*a* being set to the wired connection, the power supply control unit 33 can cause the display apparatus 20 to shift to the power-saving mode 230 when no operation is determined to be received and no video is determined to be input via the wired connection or the wireless connection for the certain period of time.

Since the extended transition time is longer than a certain period of time, the display apparatus 20 is further restricted from shifting to the power-saving mode 230. Thus, even when the operator takes time to set up the wireless connection of the communication terminal 40, the wireless connection of the display apparatus 20 is less likely disabled. In addition, the electric power is prevented from being consumed without the display apparatus 20 shifting to the power-saving mode 230.

Figure 14A:
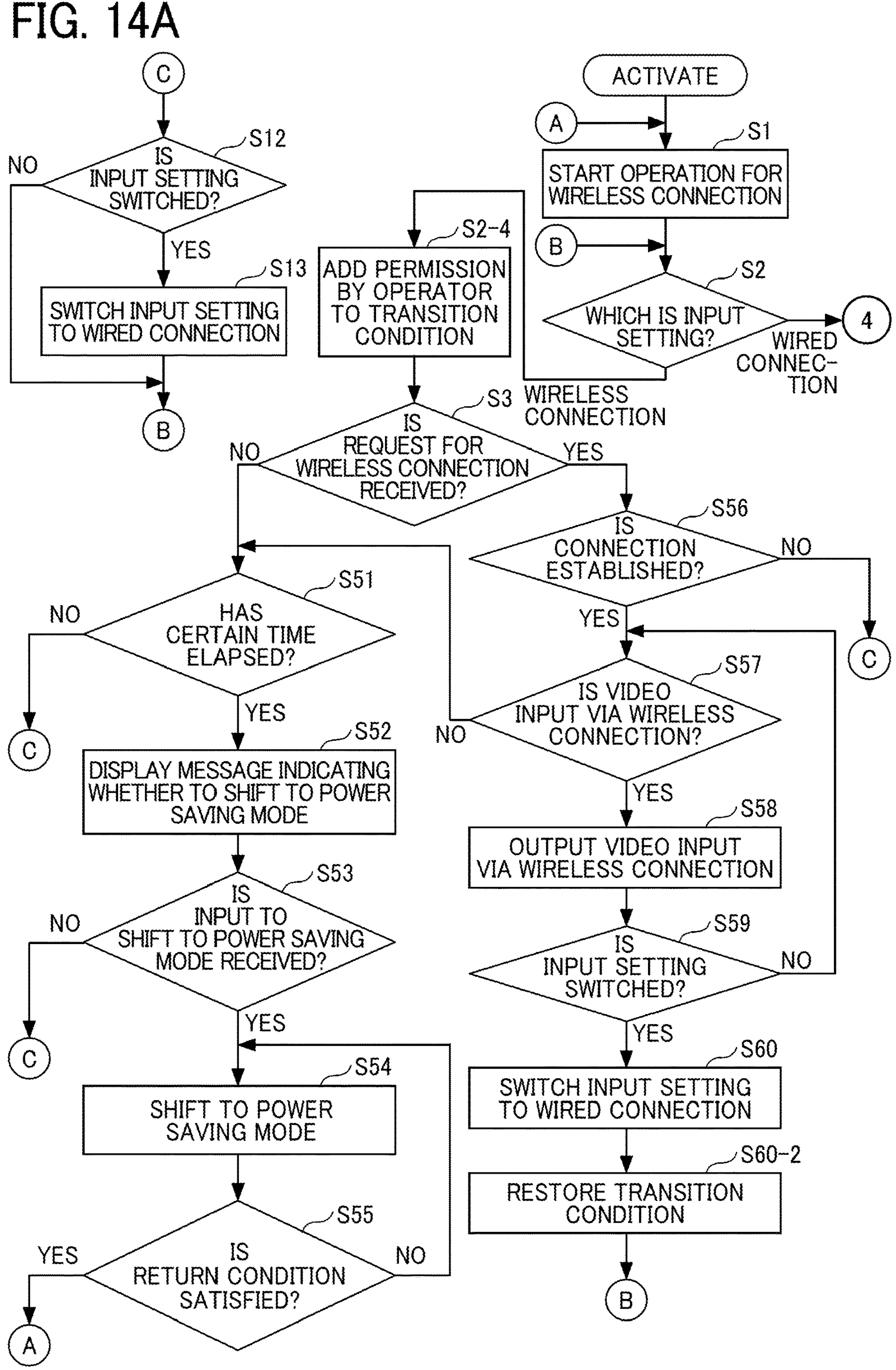
FIGS. 14A and 14B are flowcharts of the third processing performed by a display apparatus, which once restricted from shifting to a power-saving mode, to shift to the power-saving mode from an output-enabled mode and to return to the output-enabled mode from the power-saving mode, according to an embodiment of the present disclosure.
Figure 14B:
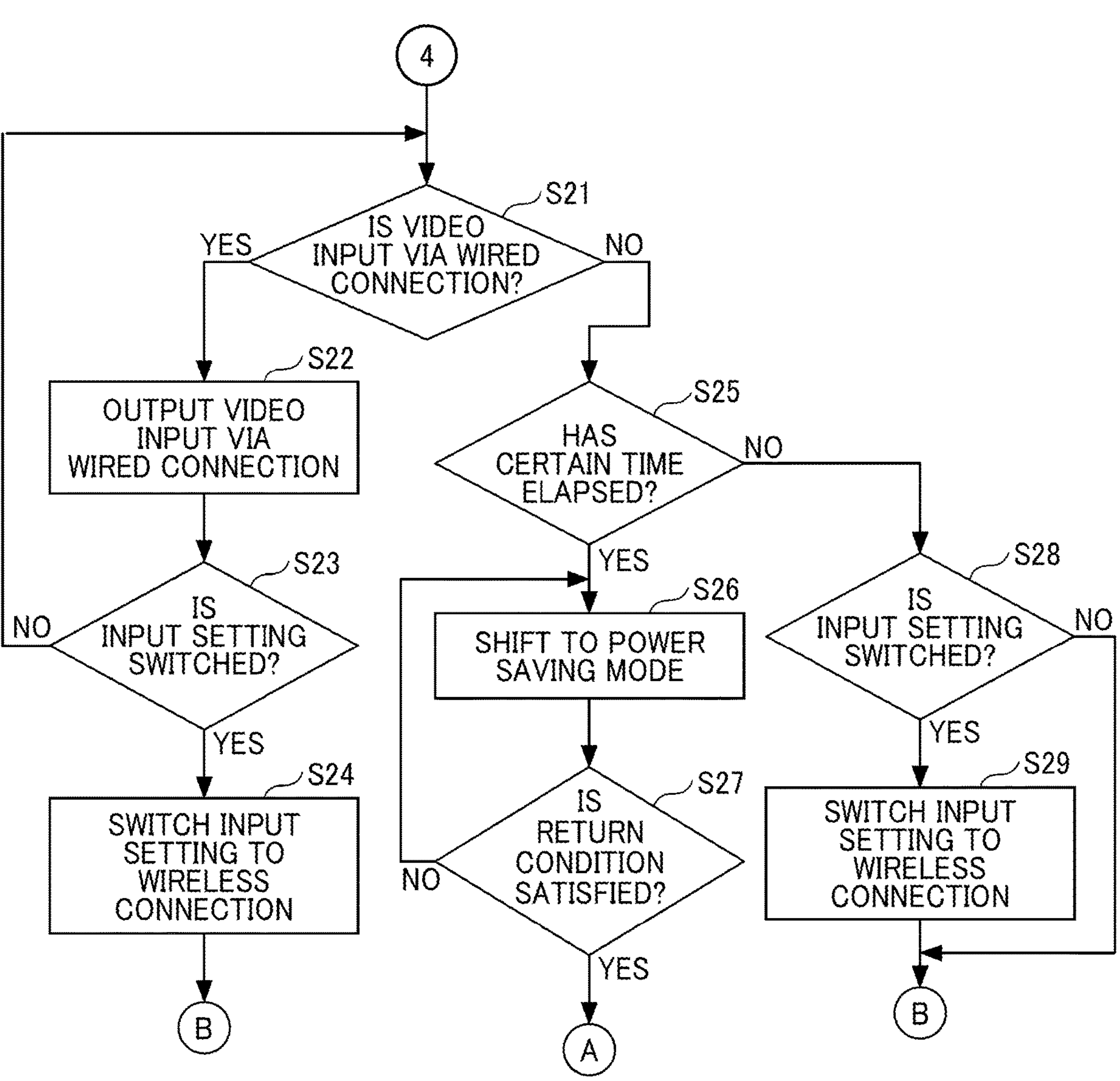

Referring to FIGS. 13, 14A, and 14B, a transition condition and a return condition according to the present embodiment are described below as the third transition control.

FIG. 13 is a diagram illustrating statuses of the power supply of the display apparatus 20, still another transition condition to shift to the power-saving mode, and still another return condition to return to the power-saving mode when the input setting 25*a* is set to the wireless connection, according to an embodiment of the present disclosure.

In the description with reference to FIG. 13, for simplicity, the differences from FIG. 6 are described.

As illustrated in FIG. 13, when the input setting 25*a* is set to the wireless connection, the transition condition is as follows.

The transition condition to shift to the power-saving mode 230 from the output-enabled mode 220 is no operation, no video input via the wired connection or the wireless connection for a certain period of time, and permission given by the operator.

In other words, when a certain period of time is determined to have elapsed and permission is given by the operator, the power supply control unit 33 causes the display apparatus 20 to shift to the power-saving mode 230. When permission is not given by the operator, the power supply control unit 33 does not cause the display apparatus 20 to shift to the power-saving mode 230. Accordingly, the display apparatus 20 is prevented from shifting to the power-saving mode where the connection via the wireless connection is disabled, while the operator takes time to set up the wireless connection of the communication terminal 40. When permission is given by the operator, the power supply control unit 33 causes the display apparatus 20 to shift to the power-saving mode 230. Accordingly, the electric power is prevented from being consumed without the display apparatus 20 shifting to the power-saving mode 230.

FIGS. 14A and 14B are flowcharts of the third processing performed by the display apparatus 20, which once restricted from shifting to the power-saving mode 230, to shift to the power-saving mode 230 from the output-enabled mode 220 and return to the output-enabled mode 220 from the power-saving mode 230, according to an embodiment of the present disclosure.

In the description with reference to FIGS. 14A and 14B, for simplicity, the differences from FIGS. 7A and 7B are described.

In FIG. 14A, the processing of steps S52 and S53 is added. Except for the processing of steps S52 and S53, the processing of steps S51 to S60 in FIG. 14A is substantially the same as the processing of steps S4 to S11 in FIG. 7A.

In step S2, the changing unit 26 checks the input setting 25*a* set in the switching unit 25. When the input setting 25*a* is set to the wireless connection, in step S2-4, the changing unit 26 adds permission by the operator as a part of the transition condition to shift to the power-saving mode 230. Accordingly, as described below with reference to the flowchart of FIGS. 14A and 14B, a dialog box 210 for shifting the mode is displayed.

Figure 15:
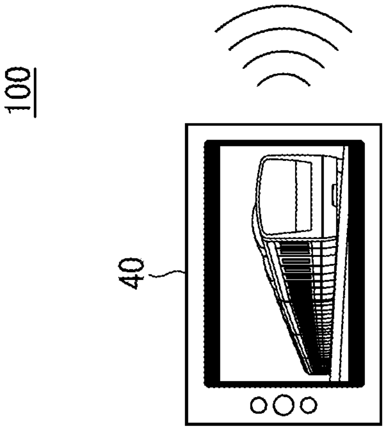
FIG. 15 is a diagram illustrating a dialog box for shifting a mode displayed by a display apparatus according to an embodiment of the present disclosure.

In step S52 at which a certain period of time is determined to have elapsed, the output unit 24 displays the dialog box 210 for shifting the mode that includes a message indicating "Do you want to shift to the power-saving mode?" In FIG. 15, the dialog box 210 for shifting the mode is given by way of example.

In step S53, the operation reception unit 23 determines whether an input performed by the operator to shift to the power-saving mode in response to the message indicated in the dialog box 210 for shifting the mode is received. When the result of the determination in step S53 is No, the processing proceeds to step S12. When the result of the determination in step S53 is Yes, the processing proceeds to step S54. In the case that the result of the determination in step S53 is No, the power supply control unit 33 resets a timer that measures a certain period of time. The power supply control unit 33 measures a certain period of time again. When no operation is determined to be received by the display apparatus 20 and no video is determined to be input via the wired connection or the wireless connection for the certain period of time, the output unit 24 again displays the dialog box 210 for shifting the mode. In this way, even when a certain period of time is determined repeatedly in a short period of time to have elapsed (YES in S51), the dialog box 210 for shifting the mode is prevented from being displayed at each time.

When the input setting 25*a* is switched to the wired connection in step S60, in step S60-2, the changing unit 26 validates the transition condition to shift to the power-saving mode 230 that is invalidated. In other words, the changing unit 26 deletes permission by the operator from the part of the transition condition to shift to the power-saving mode 230. In this way, when the input setting 25*a* is set to the wired connection, the power supply control unit 33 can cause the display apparatus 20 to shift to the power-saving mode 230 after a certain period of time has elapsed.

As a result, according to the processing of the flowchart illustrated in FIGS. 14A and 14B, when permission is not given by the operator, the power supply control unit 33 does not cause the display apparatus 20 to shift to the power-saving mode 230. Accordingly, the display apparatus 20 is prevented from shifting to the power-saving mode and being unable to be connected via the wireless connection while the operator takes time to set up the wireless connection of the communication terminal 40. When permission is given by the operator, the power supply control unit 33 causes the display apparatus 20 to shift to the power-saving mode 230. Accordingly, the electric power is prevented from being consumed without the display apparatus 20 shifting to the power-saving mode 230.

The "third transition control to shift to the power-saving mode in the case that the input setting is set to the wireless connection" can be performed in combination with the "second transition control to shift to the power-saving mode in the case that the input setting is set to the wireless connection."

FIG. 15 is a diagram illustrating the dialog box 210 for shifting the mode displayed by the display apparatus 20 according to an embodiment of the present disclosure.

At the time when the dialog box 210 for shifting the mode is displayed, the video input via the wireless connection is not displayed. Accordingly, the dialog box 210 for shifting the mode is displayed as a pop-up screen on, for example, a standby screen.

The dialog box 210 for shifting the mode includes a message 211, a button 212, and a button 213, each of which serves as a display component. The message 211 indicates "Do you want to shift the mode to the power-saving mode?". The button 212 indicates "YES." The button 213 indicates "NO." The operator may press the button 212 indicating "YES" to shift the mode to the power-saving mode 230 or may press the button 213 indicating "NO" not to shift the mode to the power-saving mode 230.

While the dialog box 210 for shifting the mode is displayed, the power supply control unit 33 stops counting down a certain period of time. Even when the operator concentrates on operating the communication terminal 40 and does not notice the dialog box 210 for shifting the mode, the display apparatus 20 is restricted from shifting to the power-saving mode 230. Alternatively, while the dialog box 210 for shifting the mode is displayed, the power supply control unit 33 may decrease the countdown speed for a certain period of time. In this way, when the operator moves to a place away from the display apparatus 20 due to an urgent matter, the display apparatus 20 can still shift to the power-saving mode 230. The output unit 24 may display the value of the timer that counts down a certain period of time in the dialog box 210 for shifting the mode in real time.

For example, it is assumed that the remote controller of the display apparatus 20 is dropped in a bag and the power button of the remote controller is accidentally pressed in the bag. In the case that the input setting 25*a* is set to the wireless connection, according to the processing of the flowchart illustrated in FIGS. 10A and 10B, the display apparatus 20 does not shift to the power-saving mode 230. As a result, the battery continues to drain. For this reason, it is effective that the power supply control unit 33 sets the input setting 25*a* to the wired connection when the display apparatus 20 is powered on and activated. It is assumed that the transition condition for shifting to the power-saving mode 230 is the same as the transition condition described with reference to FIG. 9.

Figure 16A:
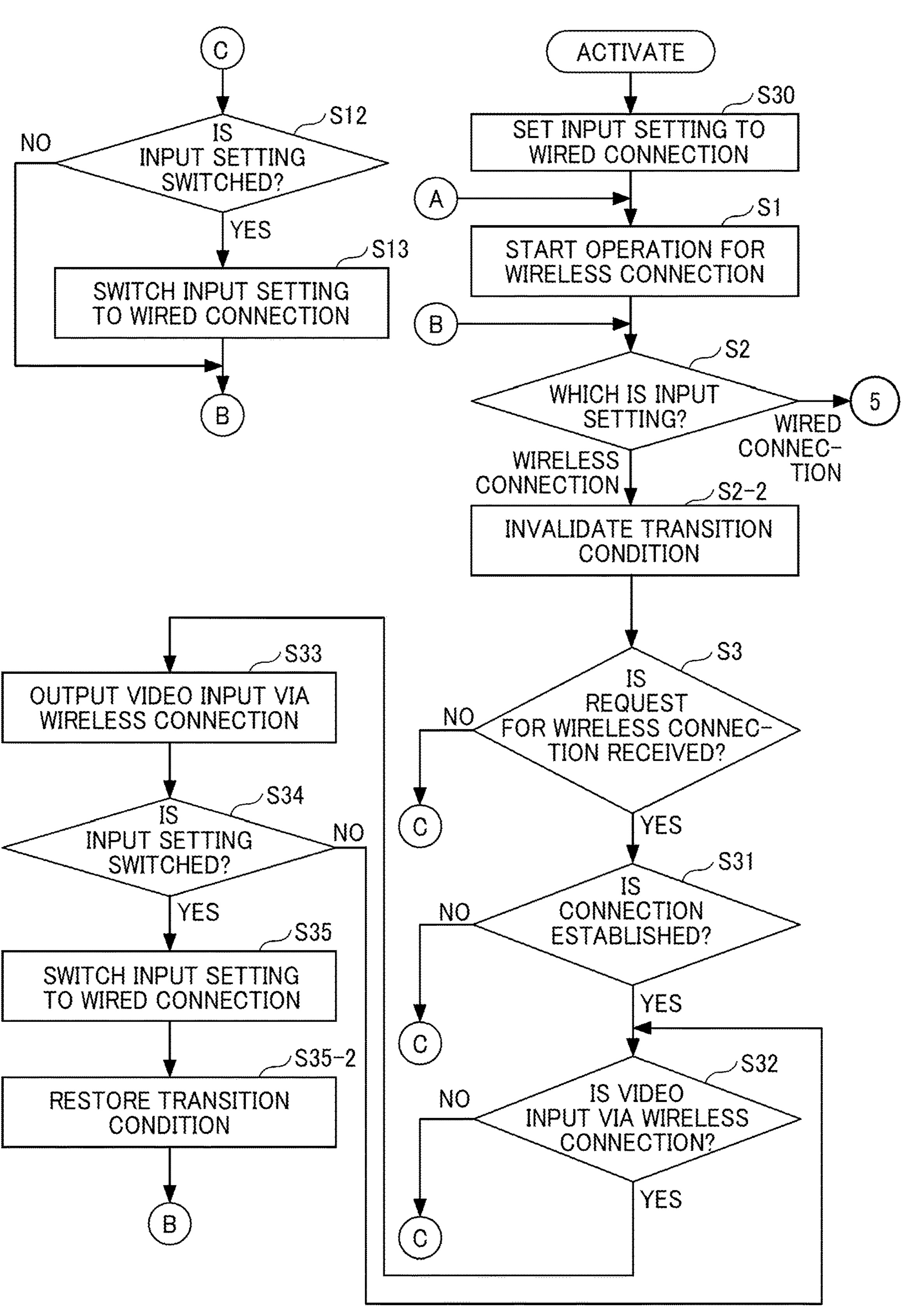
FIGS. 16A and 16B are flowcharts of the fourth processing performed by a display apparatus, which once restricted from shifting to a power-saving mode, to shift to the power-saving mode from an output-enabled mode and return to the output-enabled mode from the power-saving mode, according to an embodiment of the present disclosure.
Figure 16B:
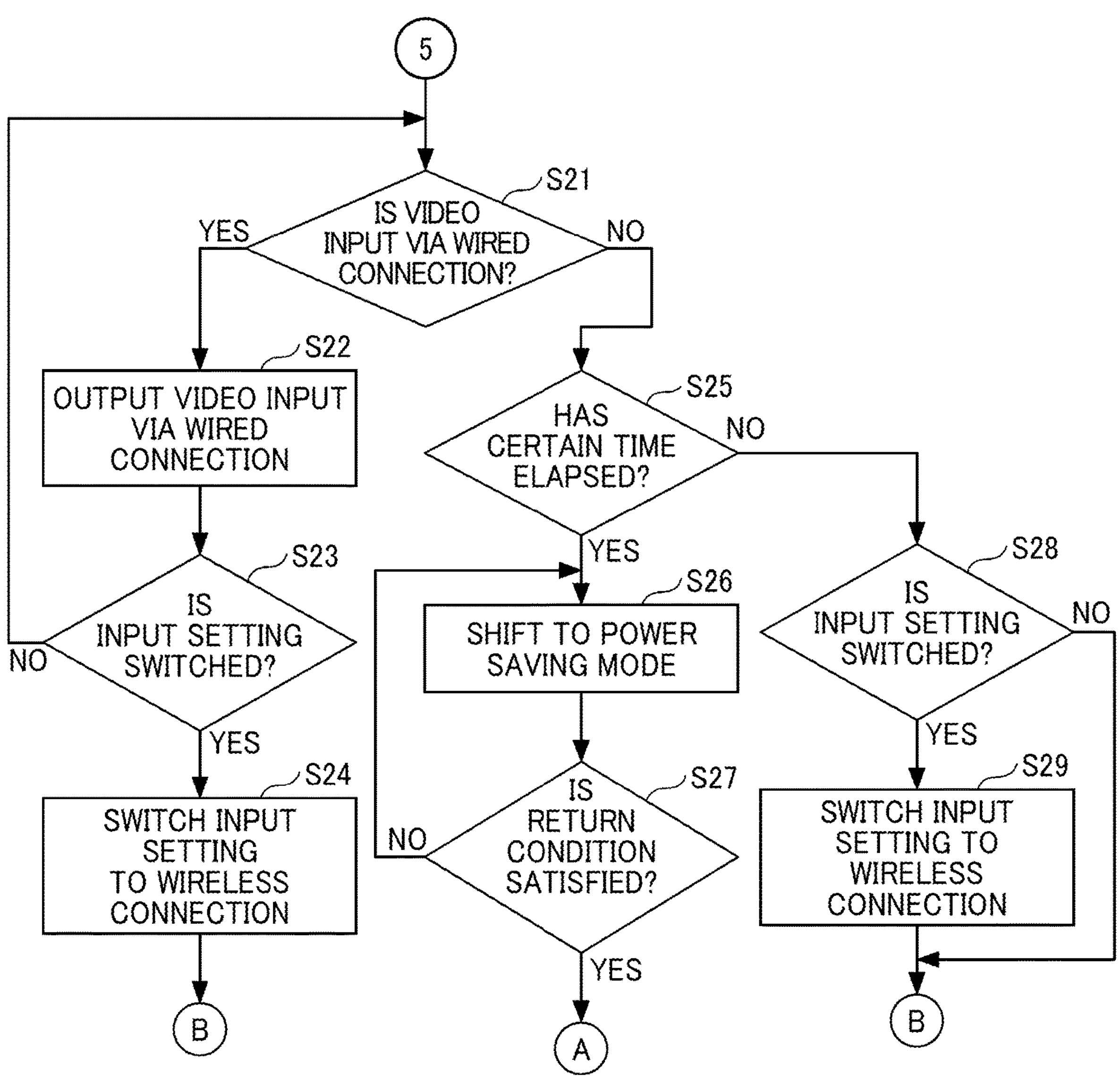

FIGS. 16A and 16B are flowcharts of the fourth processing performed by the display apparatus 20, which once restricted from shifting to the power-saving mode 230, to shift to the power-saving mode 230 from the output-enabled mode 220 and return to the output-enabled mode 220 from the power-saving mode 230, according to an embodiment of the present disclosure.

In the description with reference to FIGS. 16A and 16B, for simplicity, the differences from FIGS. 10A and 10B are described.

In FIG. 16A, the processing of step S30 is added before the processing of step S1.

In step S30, the switching unit 25 sets the input setting 25*a* to the wired connection immediately after the activation of the display apparatus 20. In this way, the input setting 25*a* is necessarily set to the wired connection at the time of activation. Accordingly, even when the display apparatus 20 is activated by an erroneous operation, the display apparatus 20 can shift to the power-saving mode 230. As a result, the battery is prevented from continuing to drain. As a method for obtaining the same effect, the switching unit 25 may set the input setting 25*a* to the wired connection when the power of the display apparatus 20 is turned off.

The "fourth transition control to shift to the power-saving mode in the case that the input setting is set to the wireless connection" may be applied to the "second and third transition controls to shift to the power-saving mode in the case that the input setting is set to the wireless connection."

Although not directly described in the above-described first to fourth transition controls to shift to the power-saving mode 230 when the input setting 25*a* is set to the wireless connection, the video transmitted by the operator may be given priority regardless of the input setting 25*a* and may be automatically displayed on the display apparatus 20.

Figure 17:
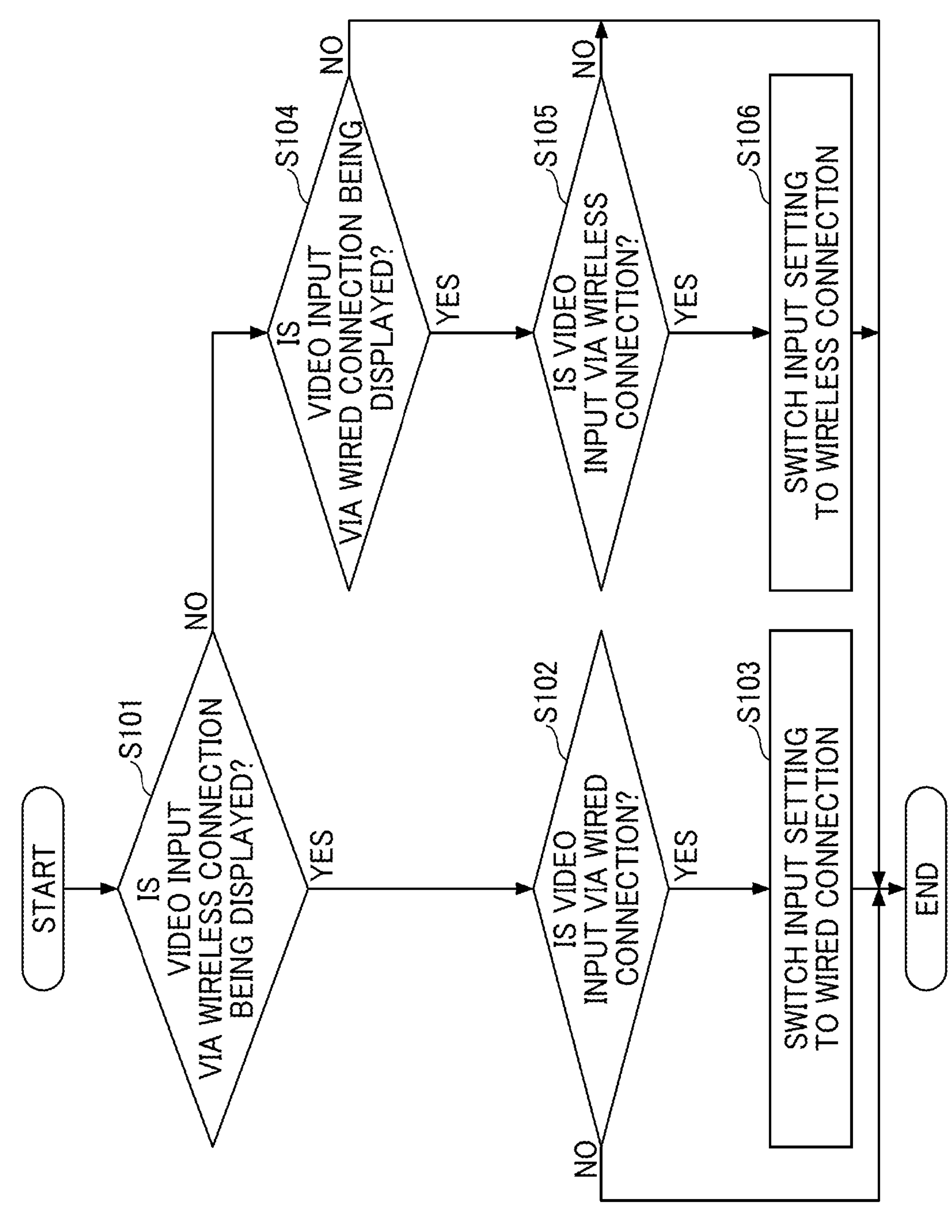
FIG. 17 is a flowchart of the processing performed by a display apparatus to automatically display a video transmitted by an operator regardless of the content of an input setting, according to an embodiment of the present disclosure.

FIG. 17 is a flowchart of the processing performed by the display apparatus 20 to automatically display a video transmitted by the operator regardless of the content of the input setting 25*a*, according to an embodiment of the present disclosure.

The processing of the flowchart illustrated in FIG. 17 is executed periodically while the display apparatus 20 is activated.

The switching unit 25 determines whether the input setting 25*a* is set to the wireless connection and the output unit 24 is displaying a video input via the wireless connection (S101). When the result of the determination in step S101 is No, the processing proceeds to step S104.

When the result of the determination in step S101 is Yes, in step S102, the switching unit 25 determines whether another video is transmitted by the operator from the communication terminal 40 via the wired connection. For example, the switching unit 25 determines whether the wired connection control unit 31 receives the other video. In the case where the result of the determination in step S102 is No, the video input via the wireless connection should remain displayed. Accordingly, the processing of the flowchart illustrated in FIG. 17 ends.

When the result of the determination in step S102 is Yes, in step S103, the switching unit 25 switches the input setting 25*a* to the wired connection. Accordingly, even when the input setting 25*a* is set to the wireless connection, the switching unit 25 switches the input setting 25*a* to the wired connection and the output unit 24 displays the other video input via the wired connection on the display panel 102.

In step S104, the switching unit 25 determines whether the input setting 25*a* is set to the wired connection and the output unit 24 is displaying the video input via the wired connection. When the result of the determination in step S104 is No, the processing of the flowchart illustrated in FIG. 17 ends. In this case, one of the first to fourth transition controls to shift to the power-saving mode 230 described above is performed.

When the result of the determination in step S104 is Yes, in step S105, the switching unit 25 determines whether another video is transmitted by the operator from the communication terminal 40 via the wireless connection. For example, the switching unit 25 determines whether the wireless connection control unit 29 receives the other video. When the result of the determination in step S105 is No, the video input via the wired connection should remain displayed. Accordingly, the processing of the flowchart illustrated in FIG. 17 ends.

When the result of the determination in step S105 is Yes, in step S106, the switching unit 25 switches the input setting 25*a* to the wireless connection. Accordingly, even when the input setting 25*a* is set to the wired connection, the switching unit 25 switches the input setting 25*a* to the wireless connection and the output unit 24 displays the other video input via the wireless connection on the display panel 102.

The output unit 24 may divide the screen of the display panel 102 to display both videos without switching between the wired connection and the wireless connection. Either of the processing for the determination in step S101 or S104 may be executed first.

As described above, the display apparatus 20 can achieve both power saving and smooth wireless connection. For example, even when the operator takes time to set up the wireless connection of the communication terminal 40, the display apparatus 20 does not automatically shift to the power-saving mode. Accordingly, the display apparatus 20 is restricted from shifting to the power-saving mode and being unable to be connected via the wireless connection while the operator takes time to set up the wireless connection of the communication terminal 40.

In the present embodiment, the case where the display apparatus 20 displays a video has been described. However, for example, the present embodiment is also suitably applicable to a case where the display apparatus 20 receives only audio and outputs only audio.

In addition, in the case of the wireless connection, the display apparatus 20 shifts to the power-saving mode. However, when the display apparatus 20 is reactivated in response to an operation performed by the operator immediately after shifting to the power-saving mode, the changing unit 26 may automatically change the transition condition. In other words, the display apparatus 20 changes the transition condition when detecting that the operator takes time to set up the wireless connection of the communication terminal 40.

In the present embodiment, the case where the display apparatus 20 is of a portable type has been described. Alternatively, the display apparatus 20 may be of a stationary type. Individual operators can display the videos of their communication terminals 40 on a large size of display apparatus 20 in, for example, a conference room. Examples of the large size of display apparatus 20 include an electronic whiteboard and digital signage.

The communication terminal 40 and the display apparatus 20 may be of the same model. For example, it is assumed that both the communication terminal 40 and the display apparatus 20 are electronic whiteboards. In this case, each whiteboard can display the screen of the other whiteboard at a teleconference, and both the electronic whiteboards can be set to the screen muted status in response to a screen mute operation to one of the electronic whiteboards.

For example, the functional configuration according to the present embodiment illustrated in FIG. 5 is divided according to functions in order to facilitate understanding of the processing executed by the display apparatus 20. No limitation to the scope of the present disclosure is intended by how the processing units are divided or by the names of the processing units. The processing units executed by the display apparatus 20 may be divided into a greater number of processing units in accordance with the contents of the processing units. In addition, a single processing unit can be divided to include a greater number of processing units.

Each of the functions of the embodiments of the present disclosure described above may be implemented by one processing circuit or a plurality of processing circuits. The "processing circuit or circuitry" herein includes a programmed processor to execute functions by software, such as a processor implemented by an electronic circuit, and devices, such as an application specific integrated circuit (ASIC), a digital signal processor (DSP), a field programmable gate array (FPGA), and circuit modules known in the art arranged to perform the recited functions.

Embodiments of the present disclosure can provide significant enhancements in computer capability and functionality. These enhancements allow the operators to take advantage of computers that provide more efficient and robust interaction with tables, which is a way to store and present information on information processing apparatuses. In addition, the embodiments of the present disclosure can provide a better operator experience through the use of a more efficient, powerful, and robust user interface. Such a user interface provides a better interaction between a human and a machine.

Aspect 1

A display apparatus that displays a video received from a communication terminal includes a first communication unit that receives a first video input via a wired connection from the communication terminal, a second communication unit that receives a second video input via a wireless connection from the communication terminal, an output unit that outputs the first video or the second video based on an input setting indicating which one of the wired connection and the wireless connection is set, a power supply control unit that causes the display apparatus to shift to a power-saving mode when a transition condition to shift to the power-saving mode from an output-enabled mode in which a video is displayed is satisfied, and a changing unit that changes the transition condition when the input setting is set to the wireless connection.

Aspect 2

In the display apparatus according to Aspect 1, the changing unit invalidates the transition condition, and the power supply control unit prevents the display apparatus from shifting to the power-saving mode.

Aspect 3

In the display apparatus according to Aspect 1, the transition condition is a condition that the display apparatus receives no operation and that no video is input via the wired connection or the wireless connection for a predetermined period of time, the changing unit extends the predetermined period of time, and the power supply control unit causes the display apparatus to shift to the power-saving mode when the display apparatus receives no operation and no video is determined to be input via the wired connection or the wireless connection for an extended period of time.

Aspect 4

In the display apparatus according to Aspect 1 or 3, the transition condition is a condition that the display apparatus receives no operation and that no video is input via the wired connection or the wireless connection for the predetermined period of time, the changing unit adds permission by a user to the transition condition, the output unit displays a display component that receives an instruction indicating whether to shift to the power-saving mode when the display apparatus receives no operation and no video is determined to be input via the wired connection or the wireless connection for the predetermined period of time, and the power supply control unit causes the display apparatus to shift to the power-saving mode when an input indicating to permit transition to the power-saving mode is received.

Aspect 5

In the display apparatus according to Aspect 4, the power supply control unit prevents the display apparatus from shifting to the power-saving mode when an input indicating not to permit the transition to the power-saving mode is received.

Aspect 6

In the display apparatus according to Aspect 5, the power supply control unit resets a timer to count the predetermined period of time when the input indicating not to permit the transition to the power-saving mode is received.

Aspect 7

In the display apparatus according to any one of Aspects 4 to 6, the power supply control unit prevents the display apparatus from shifting to the power-saving mode while the output unit is displaying the display component.

Aspect 8

The display apparatus according to any one of Aspects 1 to 7 further includes a switching unit that switches the input setting to indicate the first video to be displayed when the display apparatus is turned on, and the power supply control unit causes the display apparatus to shift to the power-saving mode on condition that the transition condition is satisfied when the input setting is set to the wired connection.

Aspect 9

In the display apparatus according to any one of Aspects 1 to 8, when the second communication unit receives the second video input via the wireless connection while the output unit is displaying the first video input via the wired connection, the switching unit switches the input setting to for displaying the first video to the input setting for displaying the second video, and the output unit displays the second video.

Aspect 10

In the display apparatus according to any one of Aspects 1 to 9, when the first communication unit receives the first video input via the wired connection while the output unit is displaying the second video input via the wireless connection, the switching unit switches the input setting for displaying the second video to the input setting for displaying the first video, and the output unit displays the first video.

Aspect 11

The display apparatus according to Aspect 2 further includes an operation reception unit that receives an operation to switch the input setting and a switching unit that switches the input setting to indicate the first video to be displayed when the operation reception unit receives the operation to switch the input setting to the wired connection from the wireless connection. The changing unit validates the invalidated transition condition that is invalidated.

Aspect 12

The display apparatus according to Aspect 3 further includes an operation reception unit that receives an operation to switch the input setting and a switching unit that switches the input setting to indicate the first video to be displayed when the operation reception unit receives the operation to switch the input setting to the wired connection from the wireless connection. The changing unit restores the extended period of time to the predetermined period of time that is previously set.

Aspect 13

The display apparatus according to Aspect 4 further includes an operation reception unit that receives an operation to switch the input setting and a switching unit that switches the input setting to indicate the first video to be displayed when the operation reception unit receives the operation to switch the input setting to the wired connection from the wireless connection. The changing unit deletes the permission by the user from the transition condition.

Aspect 14

In the display apparatus according to Aspect 2, the second communication unit determines whether a connection request to connect to the wireless connection is received from the communication terminal when the changing unit changes the transition condition in the case of the input setting being set to the wireless connection, the power supply control unit prevents the display apparatus from shifting to the power-saving mode even when the connection request to connect to the wireless connection is determined not to be received, the second communication unit determines whether the wireless connection is established with the communication terminal when the connection request to connect to the wireless connection is determined to be received, the power supply control unit prevents the display apparatus from shifting to the power-saving mode even when the wireless connection is determined not to be established, the second communication unit determines whether a video is input from the communication terminal when the wireless connection is determined to be established, and the power supply control unit prevents the display apparatus from shifting to the power-saving mode even when no video is determined to be input from the communication terminal.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

Processors are considered processing circuitry or circuitry as they include transistors and other circuitry therein. In the disclosure, the circuitry, units, or means are hardware that carries out or is programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A display apparatus comprising circuitry configured to:

receive video input via a wired connection from a communication terminal;

receive video input via a wireless connection from the communication terminal;

output a first video via the wired connection or a second video via the wireless connection based on an input setting indicating which one of the wired connection and the wireless connection is set to display on the display apparatus;

in a case where the input setting is set to the wireless connection, change a transition condition of the display apparatus, the transition condition indicating a condition in which the display apparatus shifts from a display-enabled mode for displaying video to a power-saving mode for not displaying video, and in changing the transition condition, invalidate the transition condition, and prevent the display apparatus from shifting to the power-saving mode; and in a case where the input setting is set to the wired connection, maintain the transition condition of the display apparatus without changing the transition condition.

2. The display apparatus according to claim 1, wherein, the transition condition is a condition that the display apparatus receives no operation and that no video is input via the wired connection or the wireless connection for a predetermined period of time, the circuitry is further configured to:

add permission by a user to the transition condition;

display a display component for receiving an instruction indicating whether to shift to the power-saving mode when the display apparatus receives no operation and no video is determined to be input via the wired connection or the wireless connection for the predetermined period of time; and cause the display apparatus to shift to the power-saving mode based on reception of an input indicating to permit transition to the power-saving mode.

3. The display apparatus according to claim 2, wherein the circuitry is configured to prevent the display apparatus from shifting to the power-saving mode based on reception of an input indicating not to permit the transition to the power-saving mode.

4. The display apparatus according to claim 3, wherein the circuitry is further configured to:

reset a timer to count again a time period until the predetermined period of time elapses based on reception of the input indicating not to permit the transition to the power-saving mode; and display again the display component for receiving the instruction indicating whether to shift to the power-saving mode when the display apparatus receives no operation and no video is determined to be input via the wired connection or the wireless connection for the predetermined period of time.

5. The display apparatus according to claim 2, wherein the circuitry is configured to prevent the display apparatus from shifting to the power-saving mode during when the display component is displayed.

6. The display apparatus according to claim 2, wherein the circuitry is further configured:

switch the input setting to the wired connection, in response to receiving an operation to switch the input setting to the wired connection from the wireless connection; and delete the permission by the user from the transition condition.

7. The display apparatus according to claim 1, wherein the circuitry is further configured to:

switch the input setting to indicate the wired connection when the display apparatus is turned on; and cause the display apparatus to shift to the power-saving mode based on a determination that the transition condition is satisfied.

8. The display apparatus according to claim 1, wherein the circuitry is further configured to:

switch the input setting from the wired connection to the wireless connection, in a case where the second video is determined to be input via the wireless connection while the video input via the wired connection is being displayed; and display the second video.

9. The display apparatus according to claim 1, wherein the circuitry is further configured to:

switch the input setting for displaying the video input via the wireless connection to the input setting for displaying the video input via the wired connection when the first video is determined to be input via the wired connection while the video input via the wireless connection is displayed; and display the video input via the wired connection.

10. The display apparatus according to claim 1, wherein the circuitry is further configured to:

switch the input setting to the wired connection, in response to receiving an operation to switch the input setting to the wired connection from the wireless connection; and validate the transition condition that is invalidated.

11. The display apparatus according to claim 1, wherein the circuitry is further configured to:

determine whether a connection request to connect via the wireless connection is received from the communication terminal when the transition condition is changed in a case the input setting is set to the wireless connection;

prevent the display apparatus from shifting to the power-saving mode even when the connection request to connect via the wireless connection is not received;

determine whether the wireless connection is established with the communication terminal when the connection request to connect to the wireless connection is received;

prevent the display apparatus from shifting to the power-saving mode even when the wireless connection is determined not to be established;

determine whether a video is input from the communication terminal when the wireless connection is determined to be established; and prevent the display apparatus from shifting to the power-saving mode when no video is determined to be input from the communication terminal.

12. A non-transitory recording medium storing a plurality of program codes which, when executed by one or more processors, causes the one or more processors to perform a method, the method comprising:

receiving video input via a wired connection from a communication terminal;

receiving video input via a wireless connection from the communication terminal;

outputting a first video via the wired connection or a second video via the wireless connection based on an input setting indicating which one of the wired connection and the wireless connection is set to display on the display apparatus;

in a case where the input setting is set to the wireless connection, changing a transition condition of a display apparatus, the transition condition indicating a condition in which the display apparatus shifts from a display-enabled mode for displaying video to a power-saving mode for not displaying video, and in changing the transition condition, invalidating the transition condition, and preventing the display apparatus from shifting to the power-saving mode; and in a case where the input setting is set to the wired connection, maintaining the transition condition of the display apparatus without changing the transition condition.

13. A display method executed by a display apparatus, the method comprising:

receiving video input via a wired connection from a communication terminal;

receiving video input via a wireless connection from the communication terminal;

outputting a first video via the wired connection or a second video via the wireless connection based on an input setting indicating which one of the wired connection and the wireless connection is set to display on the display apparatus;

in a case where the input setting is set to the wireless connection, changing a transition condition of the display apparatus, the transition condition indicating a condition in which the display apparatus shifts from a display-enabled mode for displaying video to a power-saving mode for not displaying video, and in changing the transition condition, invalidating the transition condition, and preventing the display apparatus from shifting to the power-saving mode; and in a case where the input setting is set to the wired connection, maintaining the transition condition of the display apparatus without changing the transition condition.

14. A display apparatus comprising circuitry configured to:

receive video input via a wired connection from a communication terminal;

receive video input via a wireless connection from the communication terminal;

output a first video via the wired connection or a second video via the wireless connection based on an input setting indicating which one of the wired connection and the wireless connection is set to display on the display apparatus;

in a case where the input setting is set to the wireless connection, change a transition condition of the display apparatus that causes the display apparatus to shift from a display-enabled mode for displaying video to a power-saving mode for not displaying video, the transition condition indicating a condition that the display apparatus receives no operation and that no video is input via the wired connection or the wireless connection for a predetermined period of time; and in a case where the input setting is set to the wired connection, maintain the transition condition of the display apparatus without changing the transition condition, wherein the circuitry is further configured to, in changing the transition condition, extend the predetermined period of time, to cause the display apparatus to shift to the power-saving mode when the display apparatus receives no operation and no video is determined to be input via the wired connection or the wireless connection for an extended period of time.

15. The display apparatus according to claim 14, wherein the circuitry is further configured to:

switch the input setting to the wired connection, in response to receiving an operation to switch the input setting to the wired connection from the wireless connection; and change the predetermined period of time from the extended period of time to the predetermined period of time that is previously set.

* * * * *